US008976123B2

(12) United States Patent
Noguchi et al.

(10) Patent No.: US 8,976,123 B2
(45) Date of Patent: Mar. 10, 2015

(54) DISPLAY DEVICE AND ELECTRONIC UNIT

(75) Inventors: Kouji Noguchi, Kanagawa (JP);
Takayuki Nakanishi, Aichi (JP); Koji Ishizaki, Aichi (JP); Takeya Takeuchi, Aichi (JP); Yasuyuki Teranishi, Aichi (JP)

(73) Assignee: Japan Display West, Inc., Chita (JP)

( * ) Notice: Subject to any disclaimer, the term of this patent is extended or adjusted under 35 U.S.C. 154(b) by 660 days.

(21) Appl. No.: 12/765,592

(22) Filed: Apr. 22, 2010

(65) Prior Publication Data
US 2010/0295824 A1 Nov. 25, 2010

(30) Foreign Application Priority Data

May 21, 2009 (JP) ................................ 2009-123261

(51) Int. Cl.
*G06F 3/041* (2006.01)
*G02F 1/1333* (2006.01)
*G06F 3/044* (2006.01)
*G02F 1/1343* (2006.01)
*G09G 3/36* (2006.01)

(52) U.S. Cl.
CPC .......... *G06F 3/0412* (2013.01); *G02F 1/13338* (2013.01); *G06F 3/044* (2013.01); *G02F 2001/134372* (2013.01); *G02F 2201/121* (2013.01); *G09G 3/3648* (2013.01)
USPC ........................................................ 345/173

(58) Field of Classification Search
USPC ................................................. 345/173–179
See application file for complete search history.

(56) References Cited

U.S. PATENT DOCUMENTS

| 4,293,734 | A |   | 10/1981 | Pepper, Jr. |
|---|---|---|---|---|
| 5,642,134 | A | * | 6/1997 | Ikeda ............................ 345/174 |
| 6,057,903 | A |   | 5/2000 | Colgan et al. |
| 2008/0218650 | A1 | * | 9/2008 | Koshihara et al. ............... 349/39 |
| 2009/0073141 | A1 | * | 3/2009 | Chino ........................... 345/175 |

FOREIGN PATENT DOCUMENTS

JP    2008-009750    1/2008

* cited by examiner

*Primary Examiner* — Alexander Eisen
*Assistant Examiner* — Cory Almeida
(74) *Attorney, Agent, or Firm* — Robert J. Depke; The Chicago Technology Law Group, LLC

(57) ABSTRACT

The display device with high detection accuracy includes: display pixel electrodes; a common electrode; a display function layer; a display control circuit performing image display control by applying a pixel voltage to each of the display pixel electrodes and applying a common drive voltage to the common electrode, the common drive voltage inverting in synchronization with a drive cycle of the image display control; a touch detection electrode cooperating with the common electrode to form a capacitor; and a touch detection circuit detecting an external proximity object, based on a detection signal obtained from the touch detection electrode in response to the common drive voltage applied to the common electrode. The touch detection circuit corrects the detection signal based on a gray scale of the image signal at the time of acquisition of the detection signal, and performs the detection operation.

18 Claims, 28 Drawing Sheets

| SIGNAL LINE WRITE VOLTAGE (V) | DETECTION SIGNAL Vdet (V) |
|---|---|
| 0 | 0.50 |
| 0.5 | 0.47 |
| 1.0 | 0.44 |
| 1.5 | 0.41 |
| 2.0 | 0.38 |
| 2.5 | 0.35 |
| 3.0 | 0.32 |
| 3.5 | 0.29 |
| 4.0 | 0.26 |
| 4.5 | 0.23 |
| -0.5 | -0.47 |
| -1.0 | -0.44 |
| -1.5 | -0.41 |
| -2.0 | -0.38 |
| -2.5 | -0.35 |
| -3.0 | -0.32 |
| -3.5 | -0.29 |
| -4.0 | -0.26 |
| -4.5 | -0.23 |

WITH VOLTAGE APPLICATION (WHITE)

WITH NO VOLTAGE APPLICATION (BLACK)

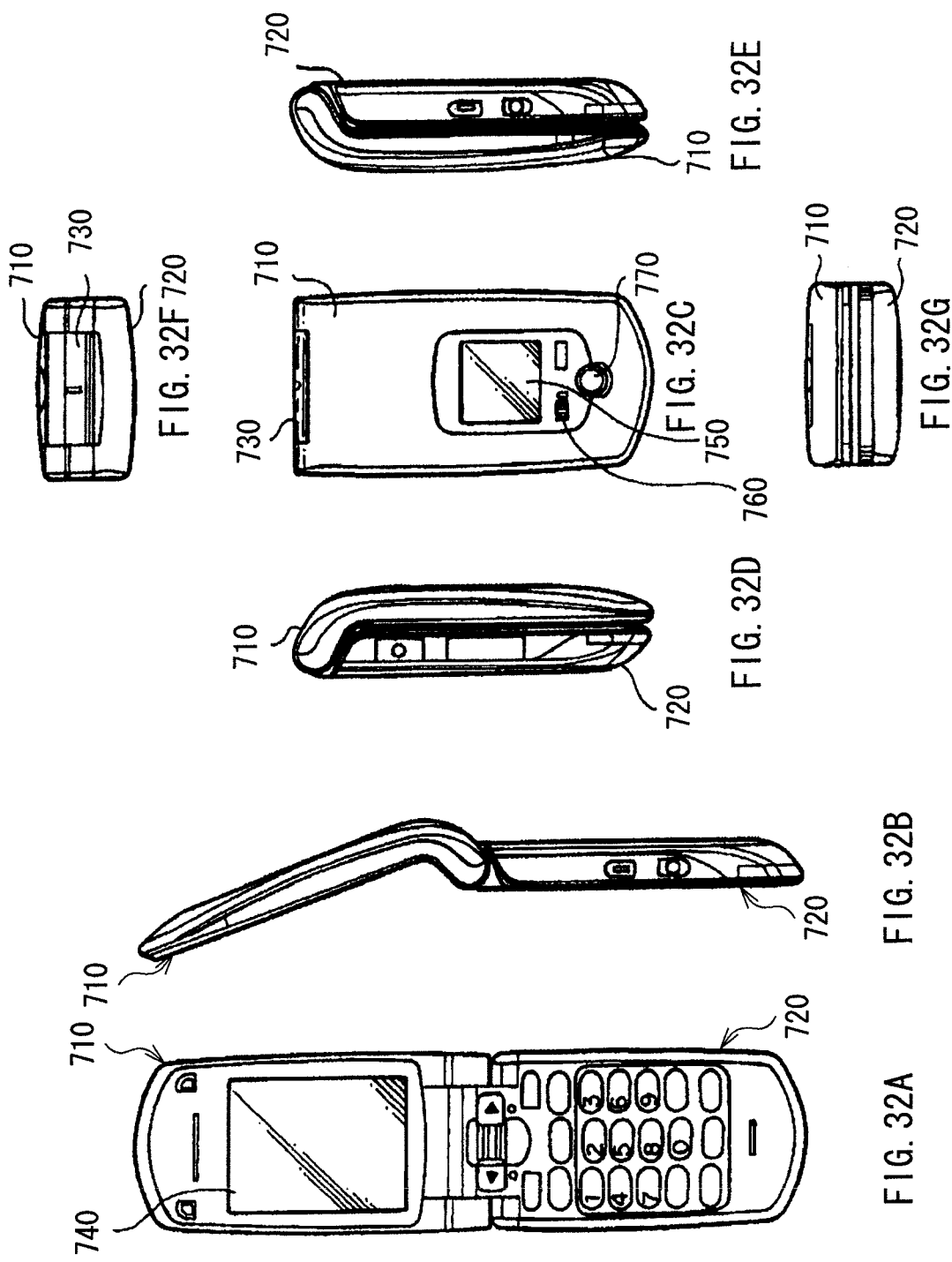

US 8,976,123 B2

DISPLAY DEVICE AND ELECTRONIC UNIT

The present application claims priority to Japanese Patent Application JP 2009-123261 filed in the Japanese Patent Office on May 21, 2009, the entire content of which is hereby incorporated by reference.

BACKGROUND OF THE INVENTION

1. Field of the Invention

The present invention relates to a display device including a liquid crystal display device and others, and particularly to a display device provided with a capacitance-type touch sensor that allows information input by a user's touch with his or her finger and others, and to an electronic unit provided therein with such a display device.

2. Description of the Related Art

A display device not using general pushbuttons as have previously been used for information input is recently receiving attention. Such a display device is exemplified by a liquid crystal display device, which is mounted directly thereon with a touch detection device generally called a touch panel. Hereinafter, such a touch detection device is referred to as touch sensor. On the display screen of the liquid crystal display device, various types of buttons are displayed for alternative use of the general pushbuttons. Considering the recent trend toward larger display screens of mobile units, this technology enables sharing of placement space between the display screen and the buttons, thereby indeed bringing the great advantages of space saving and a reduced number of components. However, such a technology has a problem of increasing the thickness of the liquid crystal module in its entirety due to the mounting of the touch sensor. Especially with the use in the mobile units, the touch sensor needs a protective layer for protection from scratches, whereby the liquid crystal module tends to be thicker than before. This is problematically against another trend toward thickness reduction of the mobile units.

As examples, Japanese Unexamined Patent Application Publication No. 2008-9750 and U.S. Pat. No. 6,057,903 each describe a liquid crystal display element provided with a touch sensor, i.e., capacitance-type touch sensor, and make an attempt to reduce the thickness of the liquid crystal display element. In the capacitance-type touch sensor, a conductive film for touch sensor use is provided between a substrate and a polarizing plate of the liquid crystal display element. The substrate is the one placed on the viewing side of the liquid crystal display element, and the polarizing plate is the one placed on the outer surface thereof for viewing purpose. Between the conductive film for touch sensor use and the outer surface of the polarizing plate, the capacitance-type touch sensor is formed with a touch surface being the outer surface of the polarizing plate. As another example, Japanese Unexamined Patent Application Publication No. S56-500230 (published Japanese translation of a PCT application) describes the configuration in which a touch sensor is incorporated in a display device.

SUMMARY OF THE INVENTION

There is a concern, however, about the touch-sensor-provided liquid crystal display element described in above Japanese Unexamined Patent Application Publication No. 2008-9750 and U.S. Pat. No. 6,057,903. That is, in principle, it is necessary for the conductive film for touch sensor use to be at the same potential as a target device for incorporation, and it is necessary for the user to be properly grounded. As such, such a liquid crystal display element as above may be incorporated with no problem into a fixed television receiver whose power supply comes from wall outlets, for example, but incorporation into a mobile unit is practically difficult. Also with the above technologies, it is necessary to bring the conductive film for touch sensor use very close to a user's finger(s), and this resultantly imposes restrictions in terms of placement position thereof, e.g., the conductive film for touch sensor use is not allowed to be positioned deep inside the liquid crystal display element. That is, the design flexibility is low. Still also with the above technologies, considering the configuration of the liquid crystal display element, the circuit portions, e.g., a touch sensor drive portion and a coordinate detection portion, have to be provided separately from a display drive circuit portion of the liquid crystal display element. This results in a difficulty in the integration of circuits in the device in its entirety.

In consideration thereof, in addition to a common electrode provided originally for application of a display drive voltage, a touch detection electrode may be newly provided for forming a capacitor with the common electrode. The resulting display device is with a capacitance-type touch sensor of a new configuration. This technique is considered as a possibility because the capacitor is changed depending on whether there is any object touch, and by using the display drive voltage to be applied by a display control circuit to the common electrode (also) as a touch-sensor drive signal, the touch detection electrode provides a detection signal responding to any change of the capacitor. The resulting detection signal is then input to any predetermined touch detection circuit, thereby being able to detect any object touch. This technique indeed leads to a touch-sensor-provided display device suitable for the use with a mobile unit whose potential is often unstable. Such a resulting touch-sensor-provided display device is also high in design flexibility considering the type of a display functional layer, and has advantages of easing the integration of circuits, i.e., the integration on a single circuit board between a circuit for display use and a circuit for sensor use.

With the capacitance-type touch sensor including those described in Japanese Unexamined Patent Application Publication No. 2008-9750, U.S. Pat. No. 6,057,903, Japanese Unexamined Patent Application Publication No. S56-500230 above, and that of the new configuration as above, however, there is a problem that noise (internal noise) is added to a detection signal as a result of the writing operation of pixel signals (image signals) to display elements on a pixel basis.

For preventing any possible malfunction (erroneous detection) due to such noise resulted from the writing operation of the image signals, in U.S. Pat. No. 6,057,903 and Japanese Unexamined Patent Application Publication No. S56-500230 above, a transparent conductive layer (shielding layer) is provided between the touch sensor and the display elements. This conductive layer is fixed at a constant potential so that the above-described noise from the display elements can be shielded.

Such a technique, however, causes another problem due to a large capacitor between a detection signal line and the shielding layer, e.g., causes significant attenuation of detection signals coming from the detection signal line, and causes a large increase of power consumption and others due to a large capacity increase in a drive line.

Further, when the detection signals for touch sensor use are generated utilizing a part of the display drive circuit as in Japanese Unexamined Patent Application Publication No. S56-500230 above, if the shielding layer is provided between the display elements and the detection electrode, the detection signals are also unnecessarily shielded, thereby failing to complete the operation of detection.

Still further, with the display device provided with a capacitance-type touch sensor of the new configuration as above, as already described in the foregoing, a write waveform in a display panel is used for position detection. Therefore, considering the aperture ratio, the manufacturing process, and others, there is a difficulty in providing the shielding layer in an effective display area for eliminating the noise resulted from the writing operation of the image signals.

As such, the previous capacitance-type touch sensor has had a difficulty in, without using a shielding layer, eliminating any noise (internal noise) resulted from the writing operation of the image signals, and in increasing the accuracy of object detection.

There is a need for a display device provided with a capacitance-type touch sensor with which the accuracy of object detection can be increased without using a shielding layer, and an electronic unit provided with such a display device.

A display device according to an embodiment of the invention includes: a plurality of display pixel electrodes; a common electrode provided to oppose the display pixel electrodes; a display function layer having an image display function; a display control circuit performing image display control by applying a pixel voltage based on an image signal to each of the display pixel electrodes and applying a common drive voltage to the common electrode, the common drive voltage inverting in synchronization with a drive cycle of the image display control; a touch detection electrode cooperating with the common electrode to form a capacitor; and a touch detection circuit performing a detection operation of detecting an external proximity object, based on a detection signal obtained from the touch detection electrode in response to the common drive voltage applied to the common electrode. The touch detection circuit corrects the detection signal based on a gray scale of the image signal at the time of acquisition of the detection signal, and performs the detection operation.

An electronic unit according to an embodiment of the invention includes: a touch-sensor-provided display device. The display device includes: a plurality of display pixel electrodes; a common electrode provided to oppose the display pixel electrodes; a display function layer having an image display function; a display control circuit performing image display control by applying a pixel voltage based on an image signal to each of the display pixel electrodes and applying a common drive voltage to the common electrode, the common drive voltage inverting in synchronization with a drive cycle of the image display control; a touch detection electrode cooperating with the common electrode to form a capacitor; and a touch detection circuit performing a detection operation of detecting an external proximity object, based on a detection signal obtained from the touch detection electrode in response to the common drive voltage applied to the common electrode. The touch detection circuit corrects the detection signal based on a gray scale of the image signal at the time of acquisition of the detection signal, and performs the detection operation.

In the display device and the electronic unit according to the embodiments of the invention, the capacitor is formed between the common electrode provided originally for application of the common drive voltage and touch detection electrode which is newly provided. This capacitor is changed depending on whether there is any object touch. Accordingly, by utilizing (in a shared fashion) the common drive voltage to be applied by the display control circuit to the common electrode also as a touch-sensor drive signal, the touch detection electrode provides the detection signal responding to any change of the capacitor. The resulting detection signal is then input to the touch detection circuit, thereby being able to detect a position of touch of the object (for example, a factor such as presence or absence of touch by the object). In this configuration, the touch detection circuit corrects the detection signal based on the gray scale of the image signal at the time of acquisition of the detection signal, and performs the detection operation. The detection operation can be thus performed with a reduced influence of noise (internal noise) included in the detection signal due to the writing operation of the image signal during image display control.

According to the display device and the electronic unit of the embodiments of the invention, the detection operation of detecting the external proximity object is performed based on the detection signal obtained from the touch detection electrode in response to the common drive voltage applied to the common electrode (based on the change in the capacitor), and the detection signal is corrected based on the gray scale of the image signal at the time of acquisition of the detection signal and the detection operation is performed, in the touch detection circuit. The detection operation can be thus performed with a reduced influence of the internal noise without using a shielding layer as have previously been used. Therefore, it is possible to increase the accuracy of object detection in the display device provided with such a capacitance-type touch sensor without using a shielding layer.

BRIEF DESCRIPTION OF THE DRAWINGS

FIGS. 32A to 32G are respectively a front view of an application example 5 in an open state, a side view thereof in the open state, a front view thereof in a close state, a left side view thereof in the close state, a right side view thereof in the close state, a top view thereof in the close state, and a bottom view thereof in the close state.

DETAILED DESCRIPTION OF THE PREFERRED EMBODIMENTS

In the below, embodiments of the invention are described in detail by referring to the accompanying drawings. The description is given in the order as below.

Basic Principles of Touch Detection
1. First Embodiment (exemplary method for internal noise elimination utilizing image signals during display)
   Modified Example (exemplary method for internal noise calculation utilizing blanking period)
2. Second Embodiment (exemplary use of liquid crystal elements in lateral electric field mode as display elements)
3. Application Examples (application examples to electronic unit including touch-sensor-provided display device)
4. Other Modified Examples

[Basic Principles of Touch Detection]

First of all, by referring to FIGS. 1A to 3, described are the basic principles of touch detection in touch-sensor-provided display devices according to embodiments of the invention. This touch detection is embodied as a capacitance-type touch sensor, which configures a capacitor element using a pair of electrodes (drive electrode E1 and detection electrode E2) as exemplarily shown in FIG. 1A. The pair of electrodes are so disposed as to oppose to each other with a dielectric D sandwiched therebetween. The configuration is illustrated as an equivalent circuit of FIG. 1B. The above components, i.e., the drive electrode E1, the detection electrode E2, and the dielectric D, configure a capacitor element C1. As for the capacitor element C1, one end is connected to an alternating-current (AC) signal source (drive signal source) S, and the other end P is grounded via a resistor R and is connected to a voltage detector (detection circuit) DET. From the AC signal source S, when an AC rectangular wave Sg (Part (B) of FIG. 3) of a predetermined frequency, e.g., about several kHz to ten-odd kHz, is applied to the drive electrode E1, i.e., one end of the capacitor element C1, such an output waveform (detection signal Vdet) as shown in Part (A) of FIG. 3 appears in the detection electrode E2, i.e., the other end P of the capacitor element C1. Note that this AC rectangular wave Sg is the one corresponding to a common drive signal Vcom that will be described later.

Figure 1A:
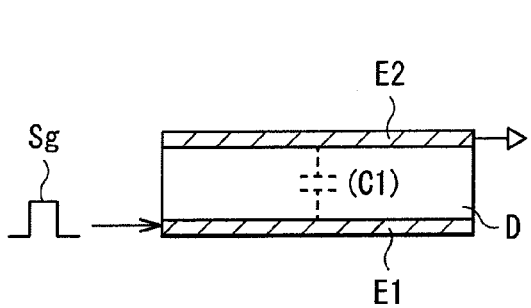
FIGS. 1A and 1B are each a view for illustrating the operational principle of touch-sensor-provided display device according to embodiments of the invention, showing the state thereof with no finger touch.
Figure 1B:
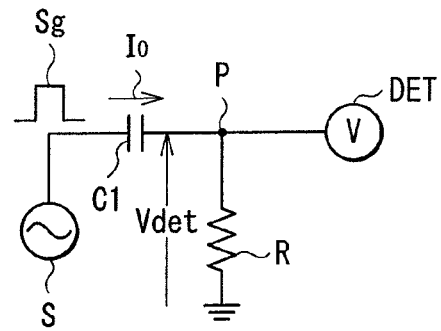

In the state with no finger touch, as shown in FIG. 1B, a current I0 flows in response to when the capacitor element C1 is charged/discharged. Herein, the current I0 is of the level in accordance with the value of the capacitor element C1. During such a current flow, the potential waveform of the capacitor element C1 at the other end P looks like a waveform V0 of FIG. 3A, for example, and this potential waveform is detected by the voltage detector DET.

Figure 2A:
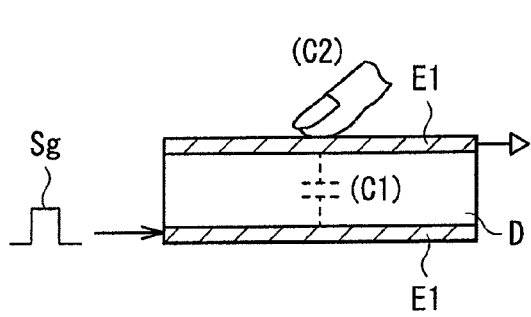
FIGS. 2A and 2B are each another view for illustrating the operational principle of the touch-sensor-provided display device according to the embodiments of the invention, showing the state with a finger touch.
Figure 2B:
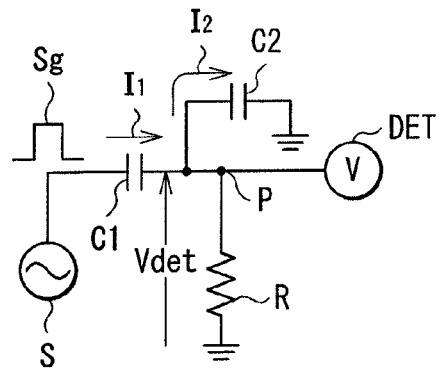
Figure 3:
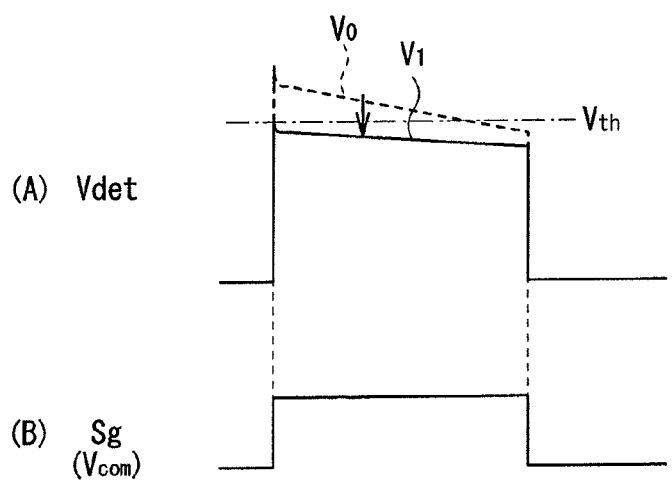
FIG. 3 is still another view for illustrating the operational principle of the touch-sensor-provided display device according to the embodiments of the invention, showing a waveform of a touch-sensor drive signal, and that of a detection signal.

On the other hand, in the state with a finger touch, as shown in FIGS. 2A and 2B, a capacitor element C2 formed by the finger is newly added in series to the capacitor element C1. In this state, currents I1 and I2 flow in response to when the capacitor elements C1 and C2 are charged/discharged, respectively. During such a current flow, the potential waveform of the capacitor element C1 at the other end P looks like a waveform V1 of FIG. 3A, for example, and this potential waveform is detected by the voltage detector DET. In this case, the point P is at the partial potential that is to be defined by the level of the currents I1 and I2 respectively flowing through the capacitor elements C1 and C2. As such, the waveform V1 has a value smaller than that of the waveform V0 in the state with no finger touch. As will be described later, the voltage detector DET compares the detected voltage with a predetermined threshold voltage Vth. When the detected voltage is equal to or larger than the threshold voltage, the voltage detector DET determines that the state is with no finger touch. On the other hand, when the detected voltage is smaller than the threshold voltage, the voltage detector DET determines that the state is with a finger touch. The touch detection is enabled as such.

1. First Embodiment

[Exemplary Configuration of Display Device 1]

Figure 4:
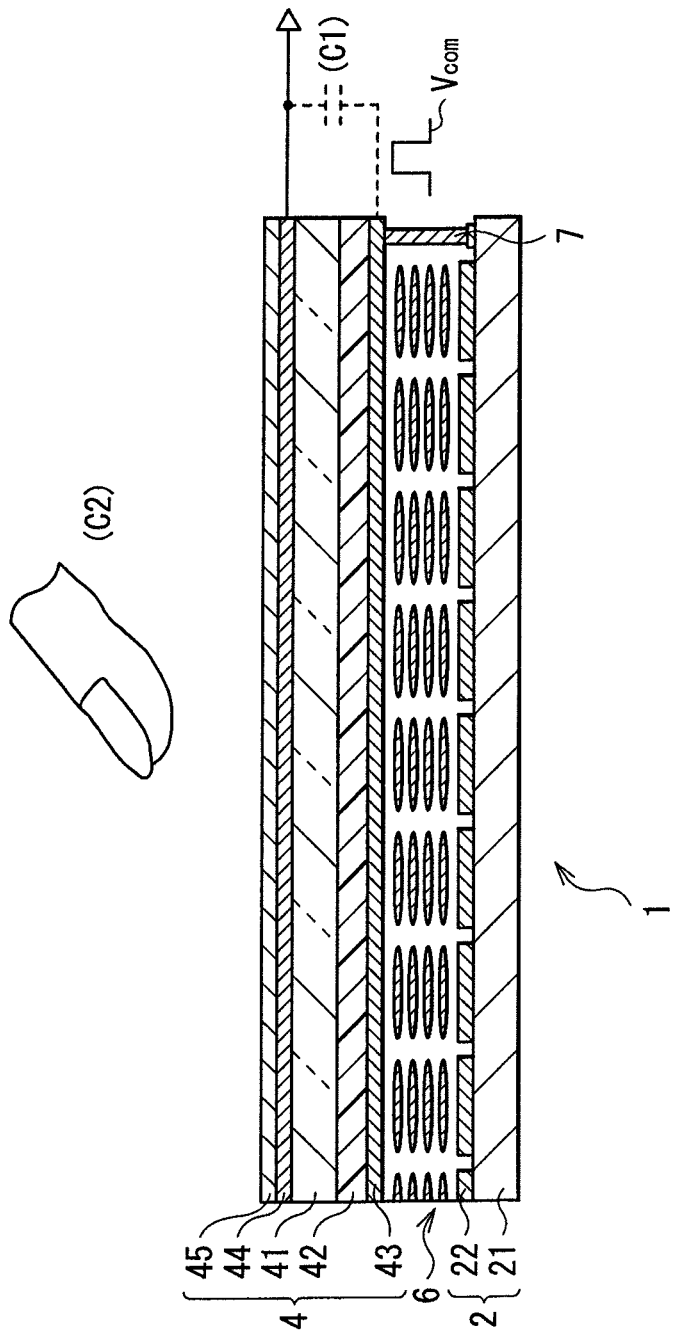
FIG. 4 is a cross-sectional view of a touch-sensor-provided display device of a first embodiment of the invention, showing the schematic cross-sectional configuration thereof.

FIG. 4 shows the cross-sectional configuration of a main part of a touch-sensor-provided display device 1 in a first embodiment of the invention. In this display device 1, a display element is a liquid crystal display element, and a capacitance-type touch sensor is configured by using a part of an electrode (common electrode 43 that will be described later) and a display-use drive signal (common drive signal Vcom that will be described later) in a shared fashion. The electrode here is the one originally provided to the liquid crystal display element.

As shown in FIG. 4, the display device 1 includes a pixel substrate 2, an opposing substrate 4, and a liquid crystal layer 6. The opposing substrate 4 is disposed to oppose the pixel substrate 2, and the liquid crystal layer 6 is inserted in between the pixel substrate 2 and the opposing substrate 4.

The pixel substrate 2 is provided with a TFT (Thin-Film Transistor) substrate 21 serving as a circuit board, and a plurality of pixel electrodes 22 arranged in matrix on the TFT substrate 21. The TFT substrate 21 is formed with, additionally to a display driver and TFTs (not shown) for driving the pixel electrodes 22, a wiring pattern including source lines and gate lines, for example. The source lines (source lines 25 that will be described later) are those for supplying image signals to the pixel electrodes, and the gate lines (gate lines 126 that will be described later) are those for driving the TFTs. The TFT substrate 21 may be also formed with a detection circuit (FIG. 8) for a touch detection operation that will be described later.

The opposing substrate 4 includes a glass substrate 41, a color filter 42, and the common electrode 43. The color filter 42 is formed on one surface of the glass substrate 41, and the common electrode 43 is formed on the color filter 42. The color filter 42 is configured by, for example, three color filter layers of red (R), green (G), and blue (B) arranged cyclically, and a set of three colors of R, G, and B is correlated to each of the display pixels (pixel electrodes 22). The common electrode 43 is used also as a sensor-use drive electrode configuring a part of the touch sensor in charge of the touch detection operation, and corresponds to the drive electrode E1 of FIG. 1A.

The common electrode 43 is coupled with the TFT substrate 21 by a contact conductive column 7. Via this contact conductive column 7, the common electrode 43 is provided with, from the TFT substrate 21, a common drive signal Vcom (i.e., a common drive voltage) of the AC rectangular waveform. This common drive signal Vcom is originally for defining a display voltage of the respective pixels in addition to a pixel voltage for application to the pixel electrodes 22. Such a common drive signal Vcom is used also as a touch-sensor drive signal, and corresponds to the AC rectangular wave Sg coming from the drive signal source S of FIG. 1B. That is, this common drive signal Vcom is reversed in polarity on a predetermined cycle basis.

The opposite surface of the glass substrate 41 is formed with a sensor-use detection electrode (touch detection electrode) 44, and on this sensor-use detection electrode 44, a polarizing plate 45 is provided. Such a sensor-use detection electrode 44 configures a part of the touch sensor, and corresponds to the detection electrode E2 of FIG. 1A.

The liquid crystal layer 6 is for modulating light that goes therethrough depending on in which state the electric field is. For the liquid crystal layer 6, used is a liquid crystal material of various modes, e.g., TN (Twisted nematic) mode, VA (Vertical Alignment) mode, and ECB (Electrically Controlled Birefringent) mode.

Note that an alignment film is provided between the liquid crystal layer 6 and the pixel substrate 2, and between the liquid crystal layer 6 and the opposing substrate 4. The lower surface side of the pixel substrate 2 is provided with a light-incident-side polarizing plate, but is not shown in the drawings.

[Exemplary Detailed Configurations of Common Electrode 43 and Sensor-Use Detection Electrode 44]

Figure 5:
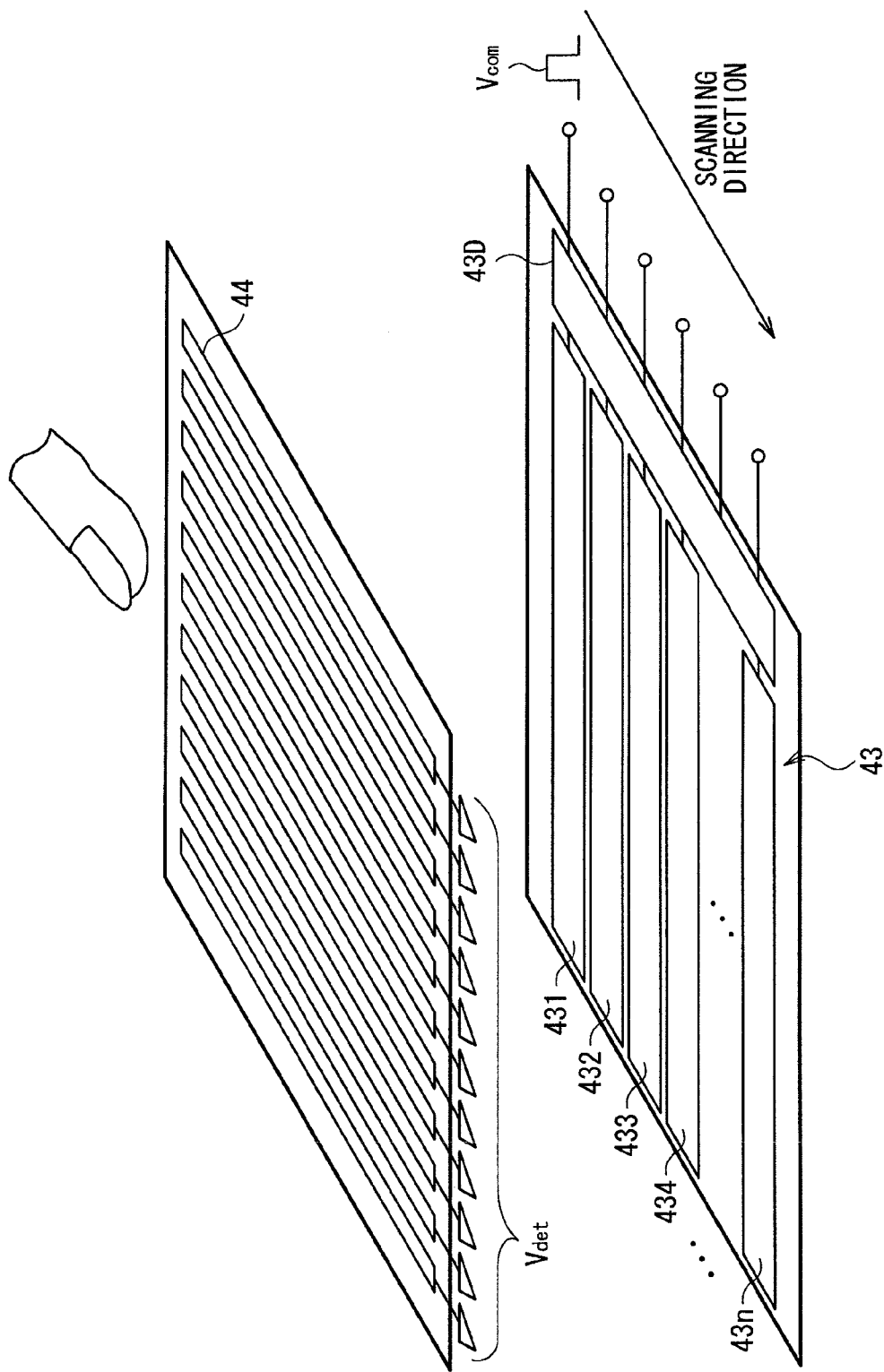
FIG. 5 is a perspective view of a main part, i.e., a common electrode and a sensor-use detection electrode, of the display device of FIG. 4, showing an exemplary configuration thereof.

FIG. 5 is a perspective view of the common electrode 43 and the sensor-use detection electrode 44 provided to the opposing substrate 4, showing their exemplary configurations. In FIG. 5 example, the common electrode 43 is divided into a plurality of stripe-shaped electrode patterns each extending in the lateral direction in the drawing. Such electrode patterns are exemplified as "n" (where "n" is an integer of 2 or larger) pieces of common electrodes 431 to 43n. The electrode patterns are provided in order with a common drive signal Vcom by a common electrode driver 43D, and are then driven for line-sequential scanning in a time-division manner as will be described later. On the other hand, the sensor-use detection electrode 44 is configured by a plurality of stripe-shaped electrode patterns, which extend in the direction orthogonal to the extending direction of the electrode patterns of the common electrode 43. The electrode patterns of the sensor-use detection electrode 44 each output a detection signal Vdet, and the resulting detection signals Vdet are input to the detection circuit 8 shown in FIGS. 6 to 8, for example.

[Exemplary Pixel Configuration and Exemplary Configurations of Drivers]

Figure 6:
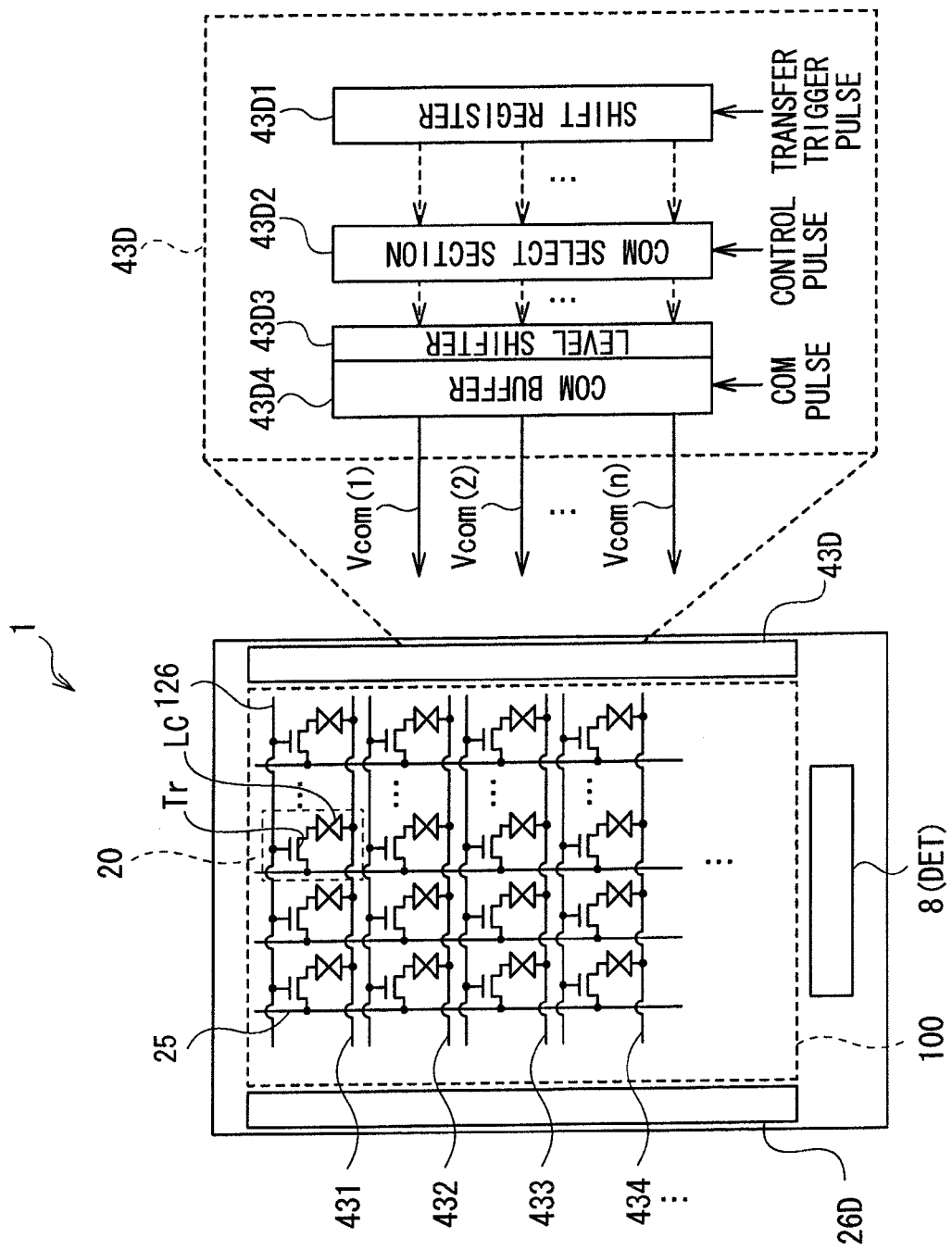
FIG. 6 is a block diagram showing an exemplary pixel configuration in the display device of FIG. 4, and an exemplary detailed configuration of a driver therein.
Figure 7:
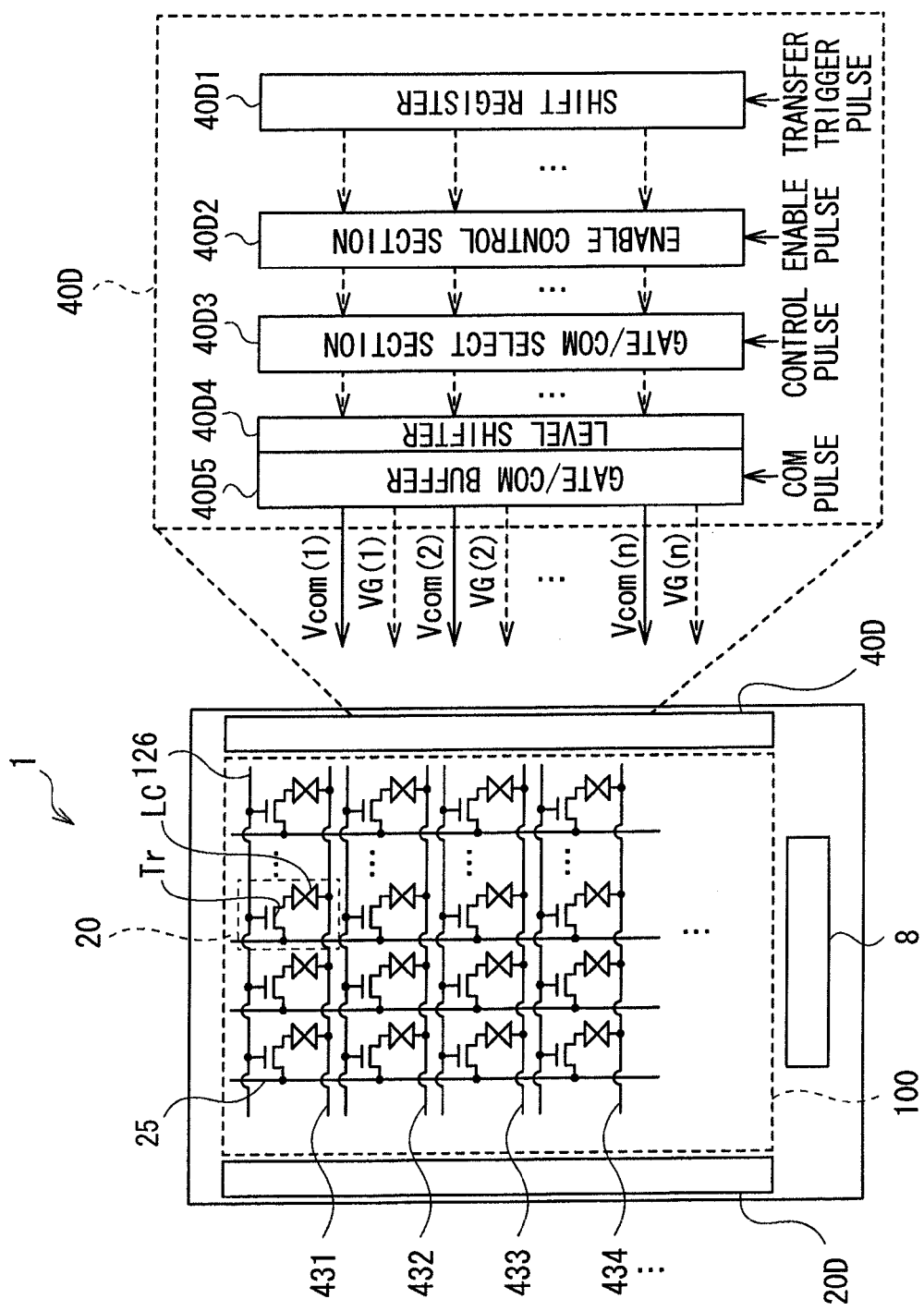
FIG. 7 is a block diagram showing another exemplary pixel configuration in the display device of FIG. 4, and another exemplary detailed configuration of the driver therein.

FIGS. 6 and 7 are each a diagram showing an exemplary pixel configuration in the display device 1, and exemplary configurations of various types of drivers therein. In the display device 1, in an effective display area 100, a plurality of pixels (display pixels 20) are arranged in matrix. The pixels here are each configured by a TFT element Tr and a liquid crystal element LC.

In FIG. 6 example, the display pixels 20 are respectively connected with the gate lines 126, the signal lines (source lines) 25, and the common electrodes 431 to 43n. Herein, the gate lines 126 are connected to a gate driver 26D, the signal lines 25 are connected to a source driver that is not shown, and the common electrodes 431 to 43n are connected to the common electrode driver 43D. As described above, the common electrode driver 43D is operated to provide in order the common drive signals Vcom (Vcom(1) to Vcom(n)) to the common electrodes 431 to 43n, respectively. This common electrode driver 43D includes a shift register 43D1, a COM select section 43D2, a level shifter 43D3, and a COM buffer 43D4, for example.

The shift register 43D1 is a logic circuit for sequential transfer of an input pulse. More specifically, this shift register 43D1 is provided with a transfer trigger pulse (start pulse) so that clock transfer is responsively started. When such an input of a start pulse is made for a plurality of times during a frame period, the clock transfer is repeated for every input. Herein, the shift register 43D1 may be configured as a plurality of transfer logic circuits for respectively controlling a plurality of common electrodes 431 to 43*n*. If this is the configuration, the control circuit may be increased in size, and thus the resulting transfer logic circuits may preferably be made available for shared use of the gate driver and the common electrode driver as shown in FIG. 7 that will be described later, and more preferably, may be solely provided irrespective of the number of the common electrodes 43.

The COM select section 43D2 is a logic circuit for controlling whether or not to output the common drive signal Vcom to each of the display pixels 20 in the effective display area 100. That is, the COM select section 43D2 is in charge of controlling the output of the common drive signal Vcom in accordance with the position of each of the display pixels 20 in the effective display area 100. Although a detailed description will be given later, if the COM select section 43D2 is provided with a control pulse being variable, the output position of the common drive signal Vcom can be changed arbitrarily on a horizontal line basis or after a plurality of horizontal periods, for example.

The level shifter 43D3 is a circuit for shifting the potential of the common drive signals Vcom coming from the COM select section 43D2 to be of a level sufficient for control.

The COM buffer 43D4 is a final-output logic circuit for sequential supply of the common drive signals Vcom (Vcom(1) to Vcom(n)), and includes an output buffer circuit or a switch circuit, for example.

On the other hand, in FIG. 7 example, the display pixels 20 are respectively connected with the gate lines 126, the common electrodes 431 to 43*n*, and the signal lines (source lines) 25. Herein, the gate lines 126 and the common electrodes 431 to 43*n* are all connected to a gate/common electrode driver 40D, and the signal lines 25 are connected to a source driver that is not shown. The gate/common electrode driver 40D is operated to provide a gate drive signal to each of the display pixels 20 over the corresponding gate line 126, and respectively provide the common drive signals Vcom (Vcom(1) to Vcom(n)) in order to the common electrodes 431 to 43*n*. Such a gate/common electrode driver 40D includes a shift register 40D1, an enable/control section 40D2, a gate/COM select section 40D3, a level shifter 40D4, and a gate/COM buffer 40D5, for example.

The shift register 40D1 has the functions similar to the shift register 43D1 described above except for it is shared by the gate driver and the common electrode driver.

The enable/control section 40D2 is for generating a pulse for use to control the gate lines 126 by capturing an enable pulse using a clock pulse transferred by the shift register 40D1.

The gate/COM select section 40D3 is a logic circuit for controlling whether or not to output the common drive signal Vcom and a gate signal VG to each of the display pixels 20 in the effective display area 100. That is, the gate/COM select section 40D3 is in charge of controlling the output of the common drive signal Vcom and that of the gate signal VG in accordance with the position for example of each of the display pixels 20 in the effective display area 100.

The level shifter 40D4 is a circuit for shifting the potential of the common drive signals Vcom and that of the gate signals VG coming from the gate/COM select section 40D3 to be of a level sufficient for control.

The gate/COM buffer 40D5 is a final-output logic circuit for sequential supply of the common drive signals Vcom (Vcom(1) to Vcom(n)) and the gate signals VG (VG(1) to VG(n)), and includes an output buffer circuit or a switch circuit, for example.

Note that, in FIG. 7 example, the display device 1 is provided with a T/G·DC/DC converter 20D in addition to the components described above. This T/G·DC/DC converter 20D serves as a T/G (Timing Generator) and a DC/DC (Direct-Current/Direct-Current) converter.

[Exemplary Circuit Configuration including Drive Signal Source S and Detection Circuit 8]

Figure 8:
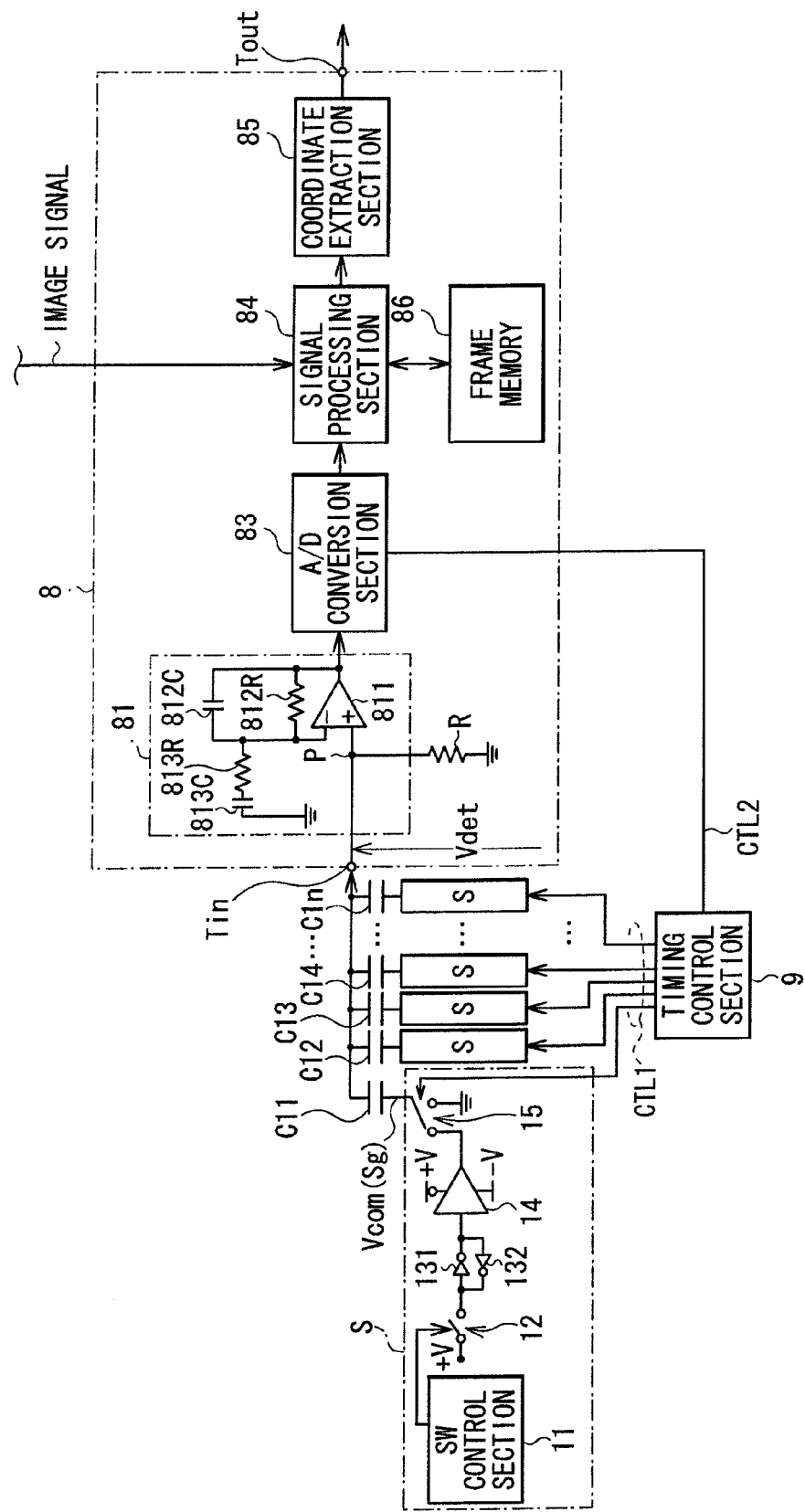
FIG. 8 is a circuit diagram showing an exemplary configuration of a detection circuit and others in the display device of FIG. 4.

FIG. 8 shows an exemplary circuit configuration including the drive signal source S of FIG. 1B and the detection circuit 8 for the touch detection operation, together with a timing control section 9 serving as a timing generator. In the drawing, capacitor elements C11 to C1*n* are those corresponding to the (electrostatic) capacitor elements of FIG. 5 formed between the common electrodes 431 to 43*n* and the sensor-use detection electrode 44.

The drive signal source S is provided to each of the capacitor elements C11 to C1*n*. Such drive signal sources S are each include an SW control section 11, two switch elements 12 and 15, two inverter (logical NOT) circuits 131 and 132, and an operational amplifier 14. The SW control section 11 is for controlling the ON/OFF state of the switch element 12, thereby controlling the connection between the power supply +V and the inverter circuits 131 and 132. The input terminal of the inverter circuit 131 is connected to an end of the switch element 12, i.e., terminal opposite to the power supply +V, and to an output terminal of the inverter circuit 132. The output terminal of the inverter circuit 131 is connected to an input terminal of the inverter circuit 132, and to the input terminal of the operational amplifier 14. With such a configuration, these inverter circuits 131 and 132 each serve as an oscillator circuit that outputs a predetermined pulse signal. The operational amplifier 14 is connected to two power sources, i.e., +V and −V. The switch element 15 is controlled in ON/OFF state in accordance with a timing control signal CTL1 coming from the timing control section 9. More specifically, such a switch element 15 establishes a connection of the one end side of each of the capacitor elements C11 to C1*n* (side of each of the common electrodes 431 to 43*n*) to the side of the output terminal of the operational amplifier 14 (side of the supply source of the common drive signals Vcom), or a grounding connection thereof. As such, the drive signal sources S provide the common drive signal Vcom to the respective capacitor elements C11 to C1*n*.

The detection circuit 8 (voltage detector DET) includes an amplifier section 81, an A/D (Analog/Digital) converter section 83, a signal processing section 84, a frame memory 86, a coordinate extraction section 85, and the resistor R described above. In such a detection circuit 8, an input terminal Tin is connected to the remaining end side of all of the capacitor elements C11 to C16, i.e., side of the sensor-use detection electrode 44.

The amplifier section 81 is provided for amplifying a detection signal Vdet coming from the input terminal Tin, and includes an operational amplifier 811 for signal amplification use, two resistors 812R and 813R, and two capacitors 812C and 813C. In the operational amplifier 811, a positive input terminal (+) is connected to the input terminal Tin, and an output terminal is connected to an input terminal of the A/D converter section 83 that will be described later. The resistor 812R and the capacitor 812C are both connected, on one ends, to an output terminal of the operational amplifier 811, and on other ends, are both connected to a negative input terminal (−) of the operational amplifier 811. The resistor 813R is connected, on one end, to the other ends of the register 812R and the capacitor 812C, and on the other end, is grounded via the capacitor 813R. With such a configuration, the register 812R and the capacitor 812C each serve as a low-pass filter (LPF) that cuts off high frequencies and passes low frequencies, and the register 813R and the capacitor 813C each serve as a high-pass filter (HPF) that passes high frequencies.

The resistor R is disposed between a connection point P of the operational amplifier 811 on the side of the positive input terminal (+) and the ground. This resistor R is provided for the sensor-use detection electrode 44 not to be in the state of floating but to remain stable. This accordingly prevents, in the detection circuit 8, the detection signal Vdet from fluctuating and changing in value. There are also advantages of being able to release the static electricity to the ground via this resistor R.

The A/D converter section 83 is for converting, into digital, an analog detection signal Vdet through with amplification by the amplifier section 81, and includes a comparator that is not shown. This comparator is for a comparison between an incoming detection signal and a predetermined threshold voltage Vth (refer to Part (A) and Part (B) of FIG. 3). Note that, for the A/D conversion in the A/D converter section 83 as such, a sampling timing is controlled by a timing control signal CTL2 coming from the timing control section 9.

To the resulting digital detection signal provided by the A/D converter section 83, the signal processing section 84 applies predetermined signal processing, e.g., digital elimination of noise, or conversion of frequency information into positional information. Although the details will be described later, the signal processing section 84 is so configured as to perform predetermined computation for eliminating (reducing) any influence of noise (internal noise) caused by the writing operation of image signals. Such computation is performed together with the frame memory 86 that stores a correction table or others that will be described later.

The coordinate extraction section 85 is for finding the detection result, i.e., YES or N0 for a user's touch, and if YES, the coordinates of the position, and outputting the result from an output terminal Tout. For such an operation, the coordinate extraction section 85 uses as a basis the detection signals, i.e., detection signals completed with elimination of internal noise described above, coming from the signal processing section 84.

Such a detection circuit 8 may be mounted on an FPC (Flexible Printed Circuit) as an external IC (Integrated Circuit), or on the substrate. Still alternatively, the detection circuit 8 may be formed in the region in the vicinity of the opposing substrate 4, i.e., in a non-display region or a frame region, or in the region in the vicinity of the pixel substrate 2. Herein, forming the detection circuit 8 on the pixel substrate 2 is considered more preferable in view of the simplification by integration of circuits, i.e., integration is achieved with various circuits originally formed on the pixel substrate 2 for display control use. For such a configuration, the detection circuit 8 on the pixel substrate 2 may be connected with the electrode patterns of the sensor-use detection electrode 44 using a contact conductive column (not shown) similar to the contact conductive column 7, and the detection signal Vdet may be provided from the sensor-use detection electrode 44 to the detection circuit 8.

[Advantages and Effects of Display Device 1]

Described next are the advantages and effects of the display device 1 of the first embodiment.

[1. Basic Operation]

In this display device 1, a display driver of the pixel substrate 2, e.g., common electrode driver 43D, line-sequentially supplies a common drive signal Vcom to the electrode patterns (common electrodes 431 to 43n) of the common electrode 43. The display driver also supplies a pixel signal (image signal) to each of the pixel electrodes 22 over the source lines 25, and in synchronization therewith, line-sequentially controls switching of the TFTs (TFT elements Tr) of the pixel electrodes over the gate lines 126. As a result, the liquid crystal layer 6 is applied with an electric field on the display pixel 20 basis so that the layer is modulated in terms of liquid crystalline state. The electric field here is in the vertical direction, i.e., direction perpendicular to the substrate, defined by the common drive signals Vcom and the image signals. In this manner, display is made by so-called inversion driving.

On the other hand, on the side of the opposing substrate 4, the capacitor elements C1 (capacitor elements C11 to C1n) are formed to the respective intersection portions between the electrode patterns of the common electrode 43 and the electrode patterns of the sensor-use detection electrode 44. Herein, as indicated by an arrow in FIG. 5, i.e., an arrow of scanning direction, if the electrode patterns of the common electrode 43 are applied in order with a common drive signal Vcom in a time-division manner, the following occurs. That is, with such application of signals, the capacitor elements C11 to C1n of a line formed to the intersection portions between the electrode patterns of the common electrode 43 and the electrode patterns of the sensor-use detection electrode 44 are charged/discharged. As a result, the electrode patterns of the sensor-use detection electrode 44 each output a detection signal Vdet of a size corresponding to the value of the capacitor elements C1. When the user's finger is not touching the surface of the opposing substrate 4, the detection signal Vdet is almost constant in size. When the scanning with the common drive signals Vcom proceeds, the line of the capacitor elements C1 being the target of charging/discharging is moved line-sequentially.

Figure 9:
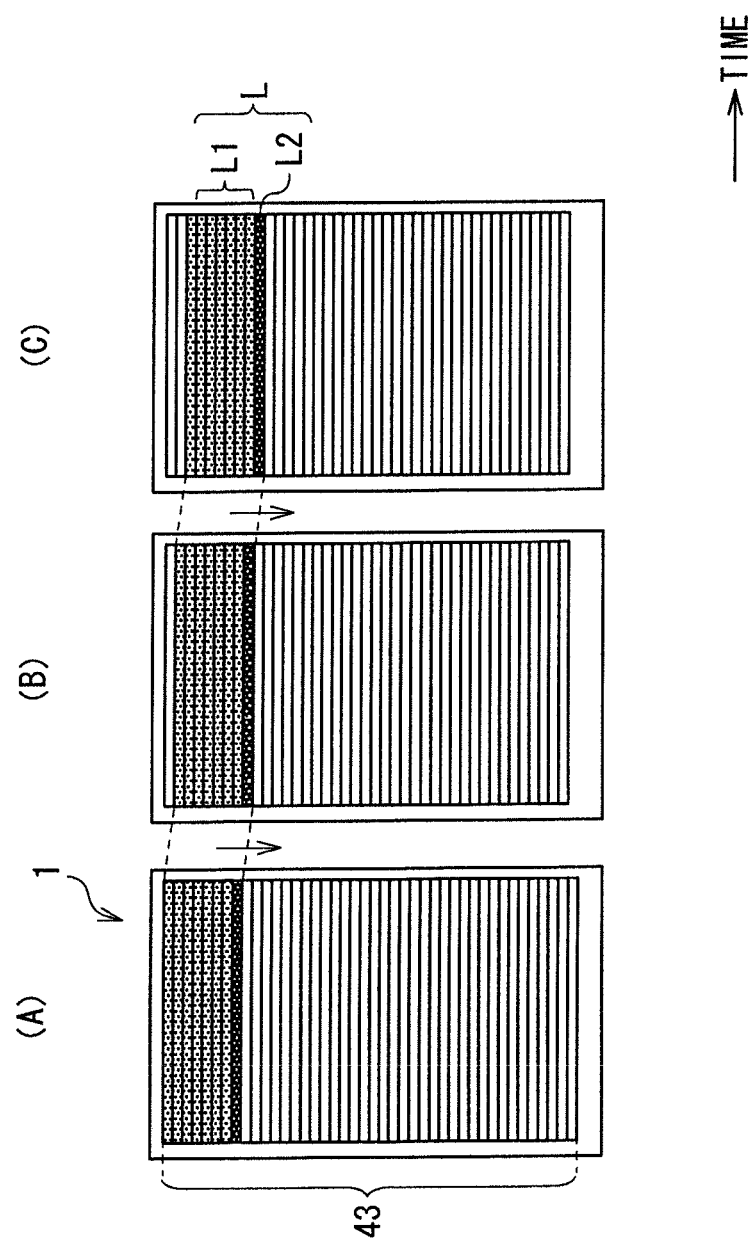
FIG. 9 is a schematic diagram exemplarily showing how a common electrode is driven for a line-sequential operation.

Herein, for line-sequential driving of the electrode patterns of the common electrode 43 as such, as exemplarily shown in Parts (A) to (C) of FIG. 9, a group (i.e. a block) of the electrode patterns of the common electrode 43 are preferably subjected to the line-sequential driving. More specifically, a drive line L being a group of the electrode patterns includes a position-detection drive line L1 and a display drive line L2. The position-detection drive line L1 is the one including a plurality of lines of electrode patterns, and the display drive line L2 is the one including a small number of lines of electrode patterns (1 line in this example). Such a configuration favorably reduces any possible deterioration of image quality caused by lines, spots, and others corresponding to the shape of the electrode patterns of the common electrode 43.

When the user's finger touches any place on the surface of the opposing substrate 4, any of the capacitor elements C1 originally formed to the touched portion is added with the capacitor element C2 by the finger. As a result, at the point in time of the scanning of the touched portion, i.e., when any of the electrode patterns of the common electrode 43 corresponding to the touched portion is applied with a common drive signal Vcom, the detection signal Vdet becomes smaller in value than that for the remaining portions on the surface of the opposing substrate 4. The detection circuit 8 (FIG. 8) then compares such a detection signal Vdet with the threshold voltage Vth, and when determining that the detection signal Vdet is smaller than the threshold voltage Vth, the detection circuit 8 determines the portion as the touched portion. The touched portion is identified by the application timing of the common drive signal Vcom, and the detection timing of the detection signal Vdet smaller than the threshold voltage Vth.

As such, in the touch-sensor-provided display device 1 of the present embodiment, the common electrode 43 originally provided to the liquid crystal display element is used also as one of a pair of electrodes for the use of the touch sensor, i.e., a pair of drive electrode and detection electrode. Also in the display device 1 of the present embodiment, a common drive signal Vcom being a display drive signal is used also as a touch-sensor drive signal. With such a configuration, the resulting capacitance-type touch sensor needs to newly include only the sensor-use detection electrode 44, and has no need to newly provide a touch-sensor drive signal. The configuration is thus favorably simplified.

Also, in the previous touch-sensor-provided display device (Japanese Unexamined Patent Application Publication No. 2008-9750), the current flowing to the sensor is measured with high accuracy, and the resulting measurement value is used as a basis to find the touched portion by analog computation. On the other hand, in the display device 1 of the first embodiment, there only needs to digitally detect any relative change (change of potential) in the current with and without a user's touch so that the detection accuracy can be increased with the detection circuit of a simple configuration. Also in the display device 1 of the embodiment, a capacitor is formed between the common electrode 43 originally provided for application of a common drive signal Vcom and the newly-provided sensor-use detection electrode 44, and touch detection is performed by any change of the capacitor caused by a user's finger touch. The resulting display device can be also suitable for use with a mobile unit in which potential of a user is often unstable.

Further, in the display device 1 of the present embodiment, the sensor-use detection electrode 44 is divided into a plurality of electrode patterns, and thus divided electrode patterns are individually driven in a time-division manner, thereby also enabling detection of a touched portion.

[2. Advantages of Features of Invention; Detection Operation using Noise Elimination Process]

Next, by referring to FIG. 10 to FIG. 18G, a detailed description is given about the detection operation using a noise elimination process, which is one of the features of the invention.

Figure 10:
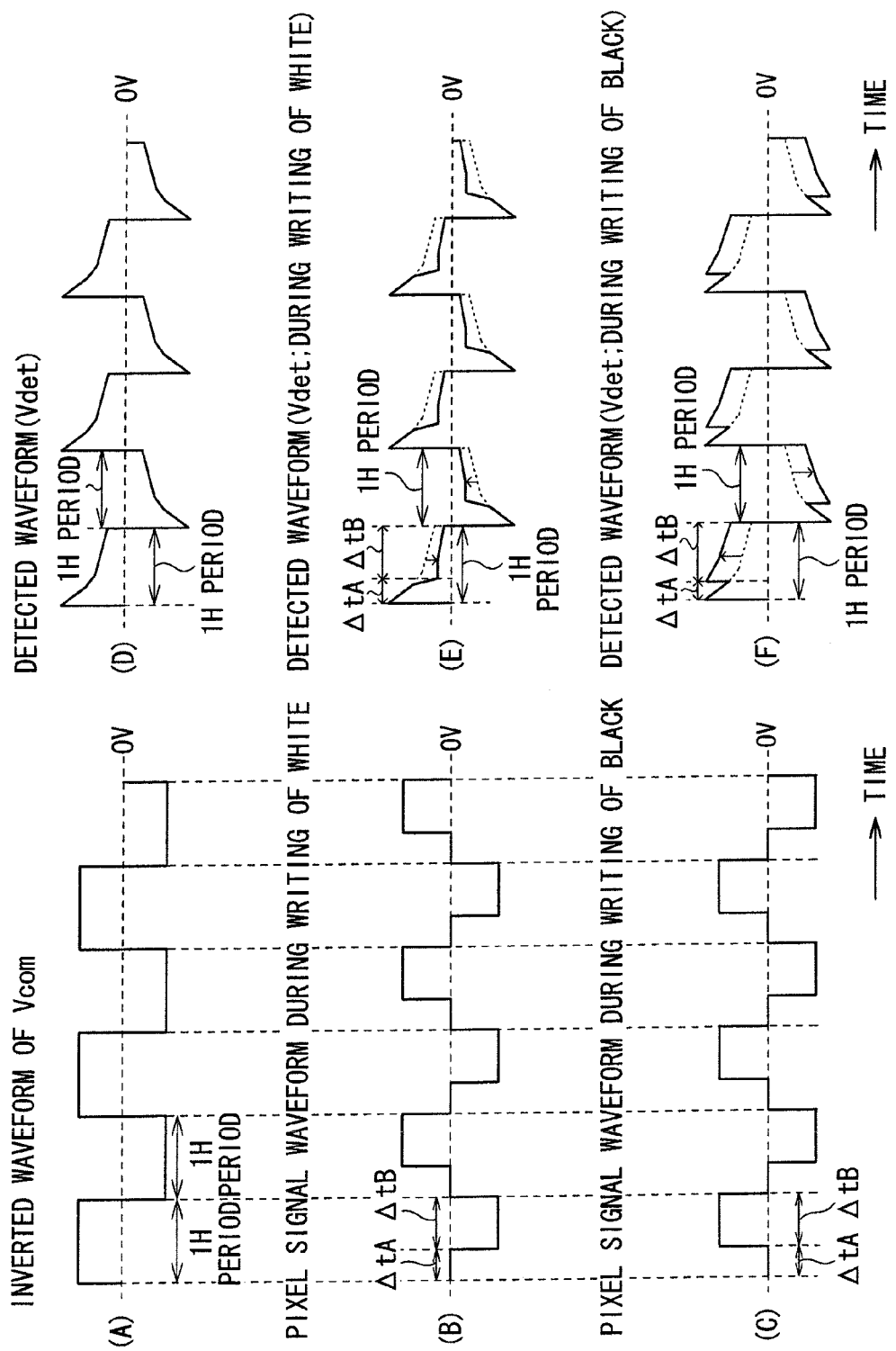
FIG. 10 is a timing waveform diagram for illustrating noise (internal noise) as a result of a display writing operation during a detection operation in the display device.

First of all, as shown in Part (A) of FIG. 10, when a common drive signal Vcom is reversed in polarity in synchronization with a drive cycle (1 H period) during such image display control as shown in Parts (B) and (C) of FIG. 10, the detection waveform of a detection signal Vdet looks like those of Parts (D) and (F) of FIG. 10. That is, the polarity reversal occurs in synchronization with such polarity reversal, and after the polarity reversal as such, the signal value is attenuated by degrees due to a leak current flowing to the resistor R described above.

During the writing of pixel signals (image signals) such as writing of white and writing of black shown in Parts (B) and (C) of FIG. 10, for example, the detection waveform of the detection signal Vdet includes noise resulted from the writing as shown in Parts (E) and (F) of FIG. 10. To be specific, the 1 H period includes a non-writing period ΔtA with no application of image signal, and a writing period ΔtB with an application of image signal. In the writing period ΔtB, the detection waveform shows fluctuations in accordance with the gray scale of the image signal. That is, in accordance with the gray scale of the image signal at the point in time, i.e., after the polarity reversal, the detection waveform of the detection signal Vdet includes noise (internal noise) caused by the image signal after the polarity reversal as indicated by arrows in Parts (E) and (F) of FIG. 10. To be specific, the detection waveform includes such after-polarity-reversal noise being in phase with the common drive signal Vcom during the writing of black, and being in opposite phase therewith during the writing of white. As such, in the writing period ΔtB, the internal noise changes the detection waveform of the detection signal Vdet in accordance with the gray scale of the image signal, thereby resulting in a difficulty in distinguishing the change from a change in the detection waveform (Part (A) and Part (B) of FIG. 3) caused by with or without touch of an object (e.g., an external proximity object), for example.

Figure 11:
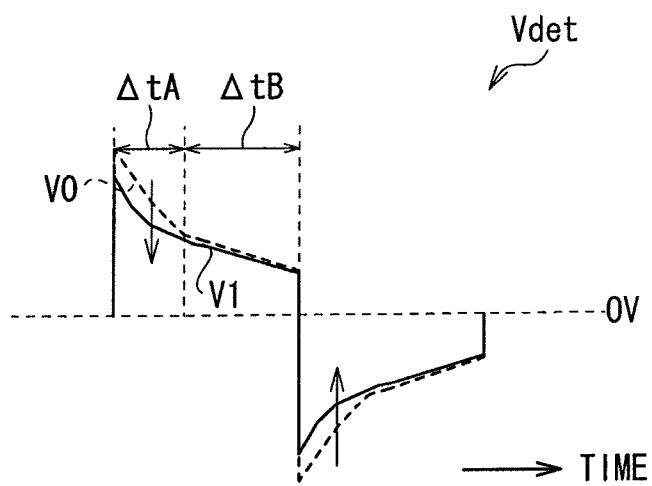
FIG. 11 is a timing waveform diagram for illustrating the relationship between a detection signal waveform and a detection period.

As shown in FIG. 11, for example, in the non-writing period ΔtA that comes immediately after the polarity reversal of the common drive signal Vcom, compared with the writing period ΔtB, an amount change of voltage caused by an object touch is very large. Accordingly, considering the high sensitivity of detection of any object touch, for example, the detection operation after the polarity reversal is preferably performed at the timing before the writing operation is started for the image signal reversed in polarity, i.e., performed in the non-writing period ΔtA.

In consideration thereof, in the first embodiment, as exemplarily shown in FIGS. 12 to 17, such an object detection with elimination of internal noise is performed in the components in the detection circuit 8, i.e., the signal processing section 84, the frame memory 86, and the coordinate extraction section 85. To be specific, in the signal processing section 84 and the frame memory 86, a detection signal Vdet is corrected in accordance with the gray scale of an image signal at the time of acquisition of the detection signal Vdet. To be more specific, a detection signal Vdet is corrected using noise data (i.e., reference noise data; refer to FIGS. 14A and 14B that will be described later) and an image signal. In the noise data, the gray scale of the image signal is correlated with the value of the detection signal including noise (internal noise) caused by the writing operation of the image signal. In the coordinate extraction section 85, the detection signal after the elimination (reduction) of the internal noise as such is used to perform the detection operation. As such, as will be described below, the detection operation can be performed while eliminating (reducing) any possible influence of noise (internal noise) generated in the detection signal Vdet due to the writing operation of the image signal during image display control. Note that, for the elimination of such internal noise, there are two techniques 1 and 2 that will be described below, for example.

[2-1. Technique 1]

Figure 12:
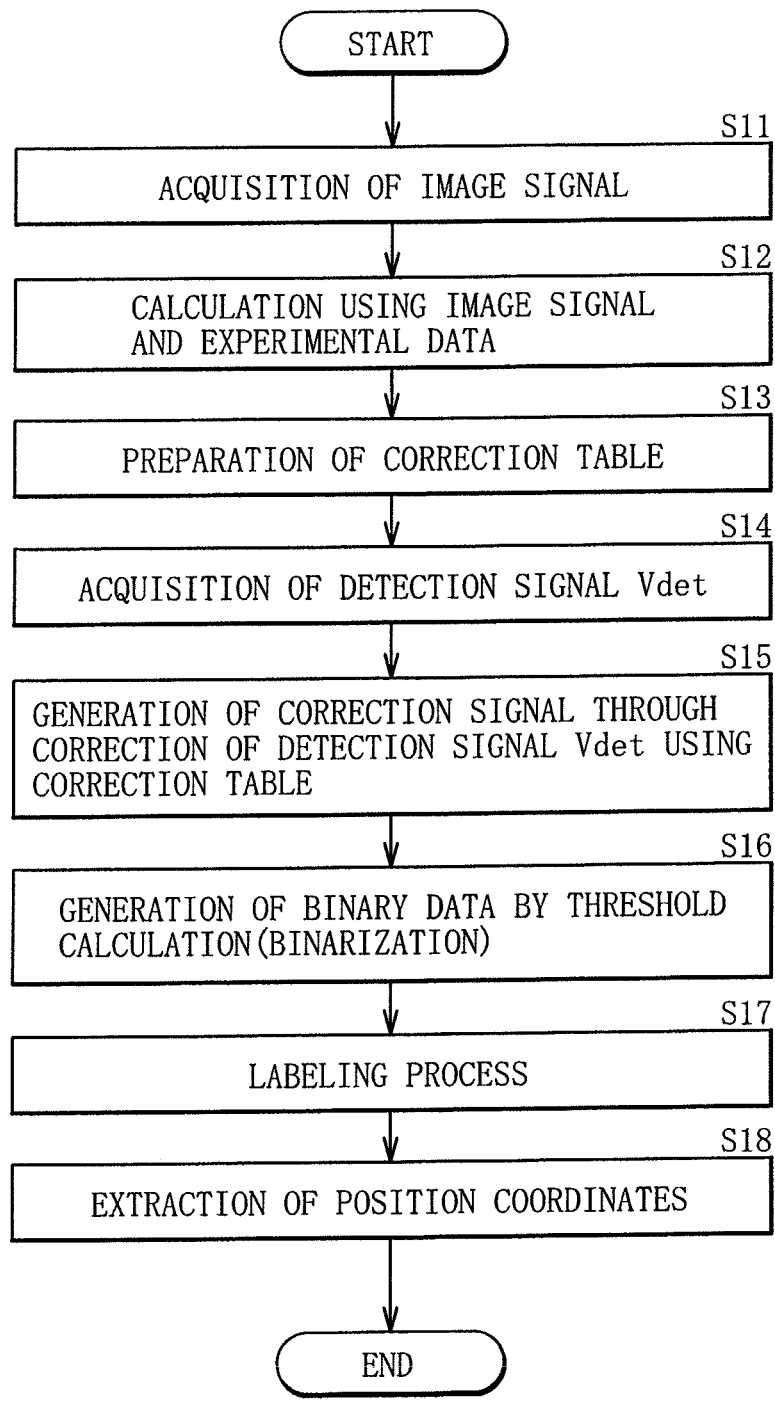
FIG. 12 is a flowchart of an exemplary method, i.e., technique 1, for internal noise elimination in the first embodiment.

FIG. 12 is a flowchart of an exemplary method for internal noise elimination, i.e., technique 1. With this technique 1, a detection signal Vdet is corrected using a predetermined correction table (will be described later) stored in the frame memory 86.

Figure 13:
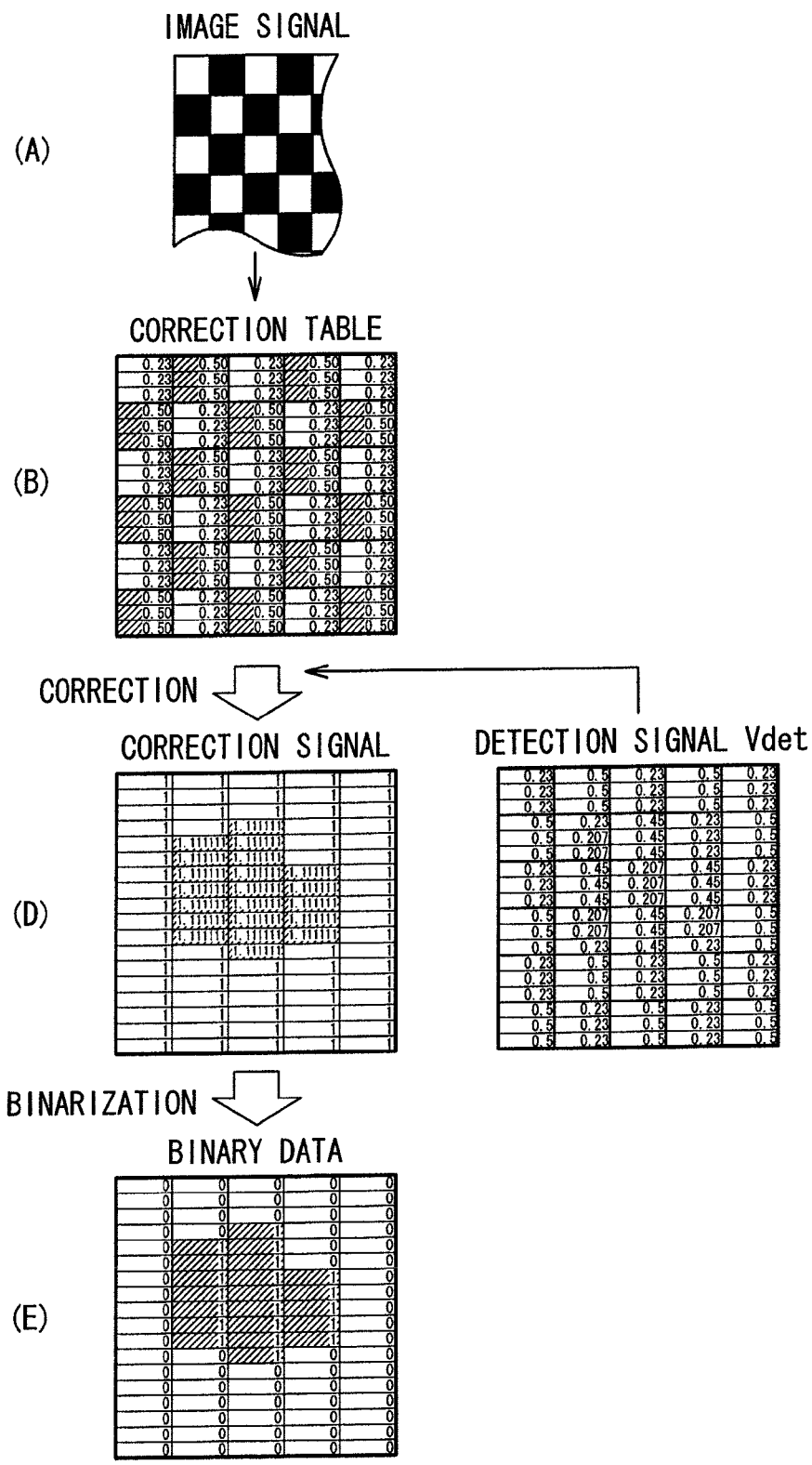
FIG. 13 is a schematic diagram for illustrating the details of the technique 1 of FIG. 12.

First of all, the signal processing section 84 and the frame memory 86 acquire such an image signal as shown in Part (A) of FIG. 13 at the time of acquisition of a detection signal Vdet (step S11). In the below, described is an exemplary case with a black-and-white zigzag pattern of an image signal in Part (A) of FIG. 13.

Next, the signal processing section 84 performs a predetermined calculation using the image signal acquired in step S11, and experimental data corresponding to the noise data described above (step S12). This experimental data is the one made ready in advance by a predetermined experiment, e.g., data of FIGS. 14A and 14B. That is, in the noise data, the writing voltage of the signal lines 25 (gray scale of the image signal) is correlated with the value of the detection signal Vdet, which includes the internal noise caused by the writing operation of the image signal in the gray scale during the image display control. The reason for using the noise data configured of the experimental data is the need to estimate the amount of internal noise by experiment for a quantification thereof because the touch sensor includes various types of capacitor components. Like the experimental data of FIGS. 14A and 14B, when the amplitude of the detection signal Vdet is opposite in phase to the amplitude of the common drive signal Vcom, if the detection signal Vdet includes any internal noise, the amplitude thereof becomes smaller. On the other hand, when such amplitudes are in phase in a large number of images, the amplitude of the detection signal Vdet becomes larger. That is, with the experimental data of FIGS. 14A and 14B, the writing voltage of the signal lines 25 establishes a simple linear equation with the value of the detection signal Vdet including the internal noise. As such, using as a basis the gray scale of the acquired image signal, the value of the detection signal Vdet including the internal noise can be found with ease.

Figure 15A:
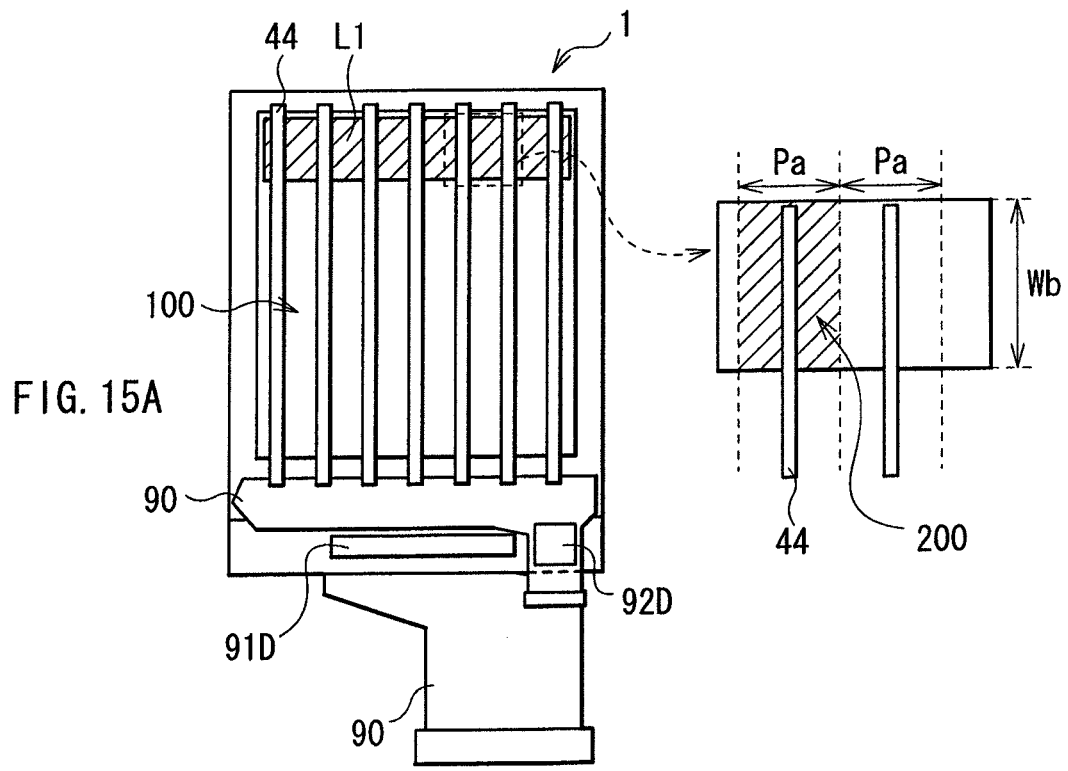
FIGS. 15A and 15B are each a plan view for illustrating a unit correction region in the display device of FIG. 4.
Figure 15B:
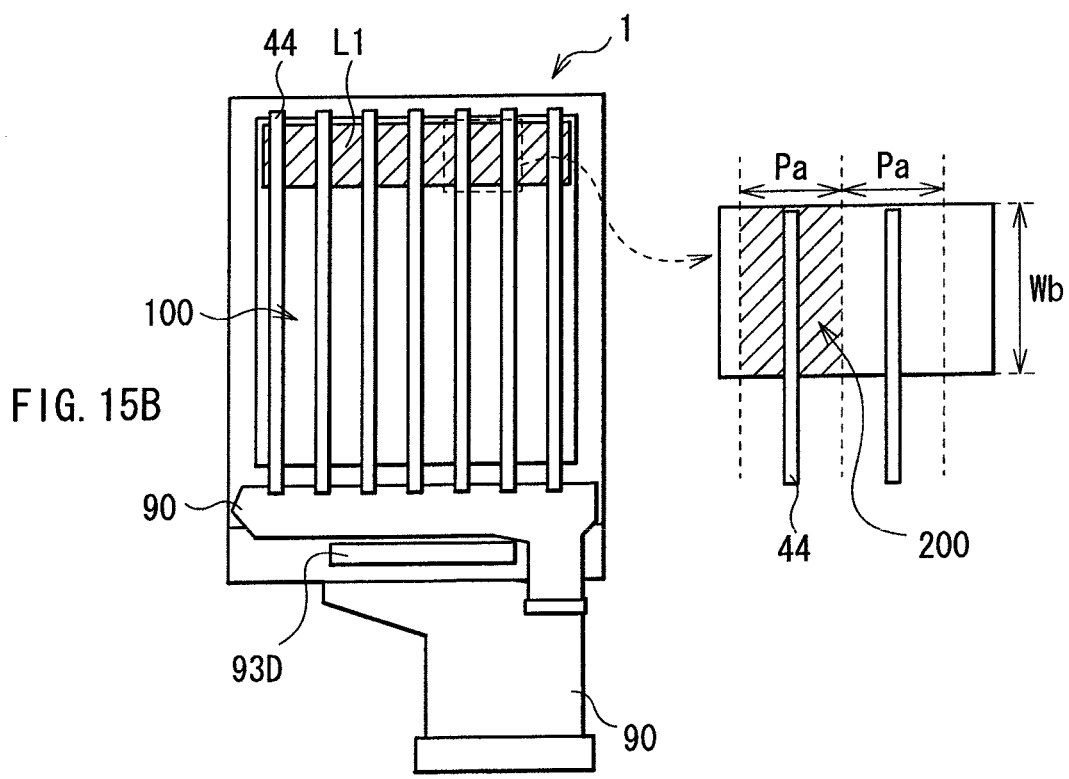

Next, using the value acquired in step S12 for the detection signal Vdet including the internal noise in the experimental data, the signal processing section 84 and the frame memory 86 prepares the value of the detection signal in the above-described correction table in accordance with the gray scale of the image signal (step S13). To be specific, as shown in Part (B) of FIG. 13, for example, on the basis of a predetermined pixel region including a plurality of image pixels 20, the correction table storing the value detected for the detection signal Vdet including the internal noise in the experimental data is prepared. Herein, the predetermined pixel region is a unit correction region 200 in FIGS. 15A and 15B, for example. These unit correction regions 200 respectively include the electrode patterns of the sensor-detection electrode 44 in the center of the length (center pitch Pa) in the direction of the horizontal lines. Moreover, the width (drive line width (width of the position-detection drive line L1) Wb) of each of the electrode patterns of the common electrode 43 is set to be the length of the unit correction region 200 in the direction of the vertical lines. That is, in such a unit correction region 200, the length in the direction of the horizontal lines is the sensor pitch Pa, and the length in the direction of the vertical lines is the drive line width Wb. The correction table stores, for the respective unit correction regions 200, the value of the detection signal Vdet including the internal noise based on the average gray scale taken for the image signals of all of the display pixels 20 in the unit correction region 200. Note that, in FIG. 15A example, a display IC 91D is provided separately from a touch-sensor IC 92D, and these ICs are coupled to each other by a wiring pattern of an FPC 90. On the other hand, in FIG. 15B example, provided is a display/touch sensor IC 93D in which a display IC and a touch sensor IC are integrated on a chip. Herein, the above-described image signal at the time of acquisition of the detection signal Vdet is provided from the display IC to the touch-sensor IC indirectly via the FPC 90 (FIG. 15A), or provided directly by the wiring pattern in the IC (FIG. 15B).

Next, the signal processing section 84 and the frame memory 86 acquire such a detection signal Vdet as shown in Part (C) of FIG. 13, i.e., the detection signal Vdet detected by the sensor-use detection electrode 44 (step S14).

Next, using the correction table prepared in step S13, the signal processing section 84 and the frame memory 86 correct the detection signal Vdet acquired in step S14, thereby generating a correction signal (step S15). More specifically, as exemplarily shown in Part (D) of FIG. 13, for each of the above-described unit correction regions 200, the signal processing section 84 and the frame memory 86 perform a subtraction or division (division in this example) of the two signal values, i.e., the value of the detection signal Vdet including the internal noise in the correction table, and the value of the acquired detection signal Vdet. This accordingly corrects the acquired detection signal Vdet so that a correction signal is generated. At this time, the signal processing section 84 and the frame memory 86 preferably utilize the correction result in all of the unit correction regions 200 in the direction of the horizontal lines, and re-correct the acquired detection signal Vdet for every unit correction region 200 in the horizontal line. As will be described later (FIGS. 18A to 18G), this favorably reduces more the influence of the internal noise included in the detection signal Vdet so that the detection accuracy can be increased to a further degree.

Next, the signal processing section 84 and the frame memory 86 perform a threshold calculation (binarization) to the correction signal generated in step S15, thereby generating such binary data as in Part (E) of FIG. 13 (step S16).

The coordinate extraction section 85 then performs a labeling process to the detection signal (binary data) through with the elimination (reduction) of internal noise as such (step S17), and then performs the detection operation by extracting the position coordinates (step S18). This is the end of the detection operation in the technique 1 of FIG. 12.

With the technique 1 as such, the detection signal Vdet is corrected using a predetermined correction table stored in the frame memory 86. This enables the detection operation with elimination (reduction) of any influence of noise (internal noise) generated in the detection signal Vdet due to the writing operation of the image signal during the image display control.

[2-2. Technique 2]

Figure 16:
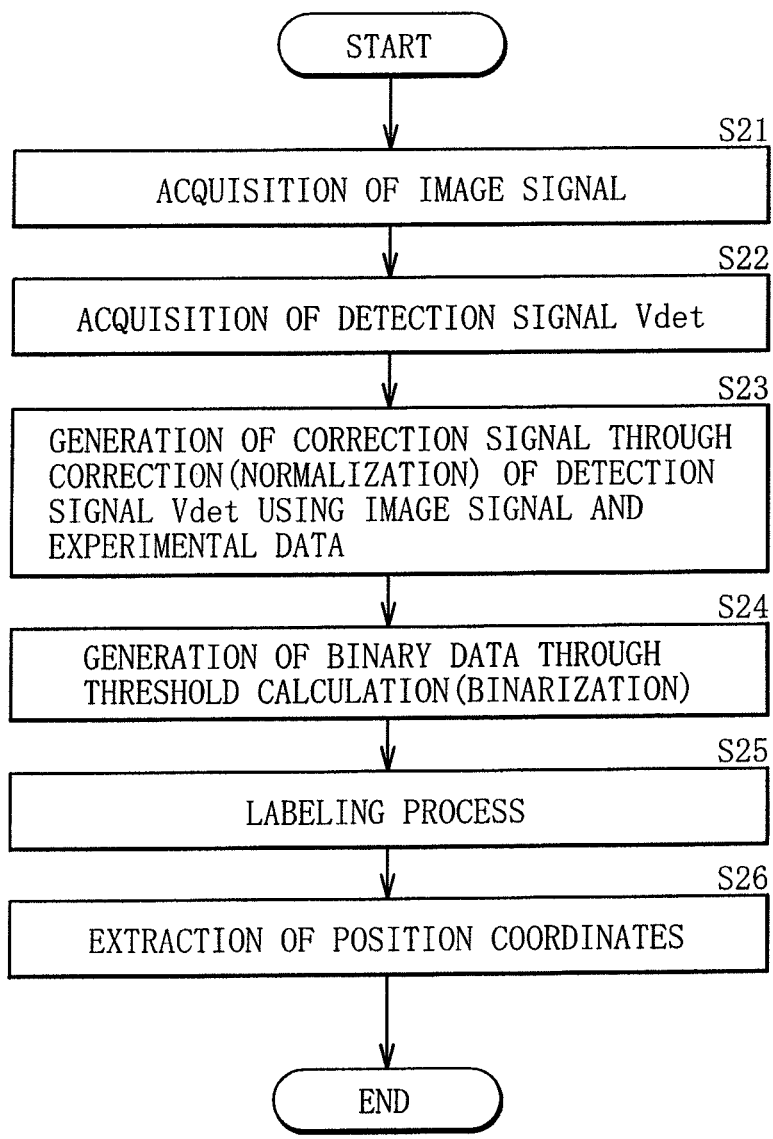
FIG. 16 is a flowchart of another exemplary method, i.e., technique 2, for internal noise elimination in the first embodiment.

FIG. 16 is a flowchart of another exemplary method for internal noise elimination, i.e., technique 2. With this technique 2, unlike the technique 1 described above, a detection signal Vdet is corrected without using the correction table described above. That is, by a predetermined computation below between an image signal during the detection and a detection signal Vdet, the detection signal Vdet is directly corrected without using such a correction table.

Figure 17:
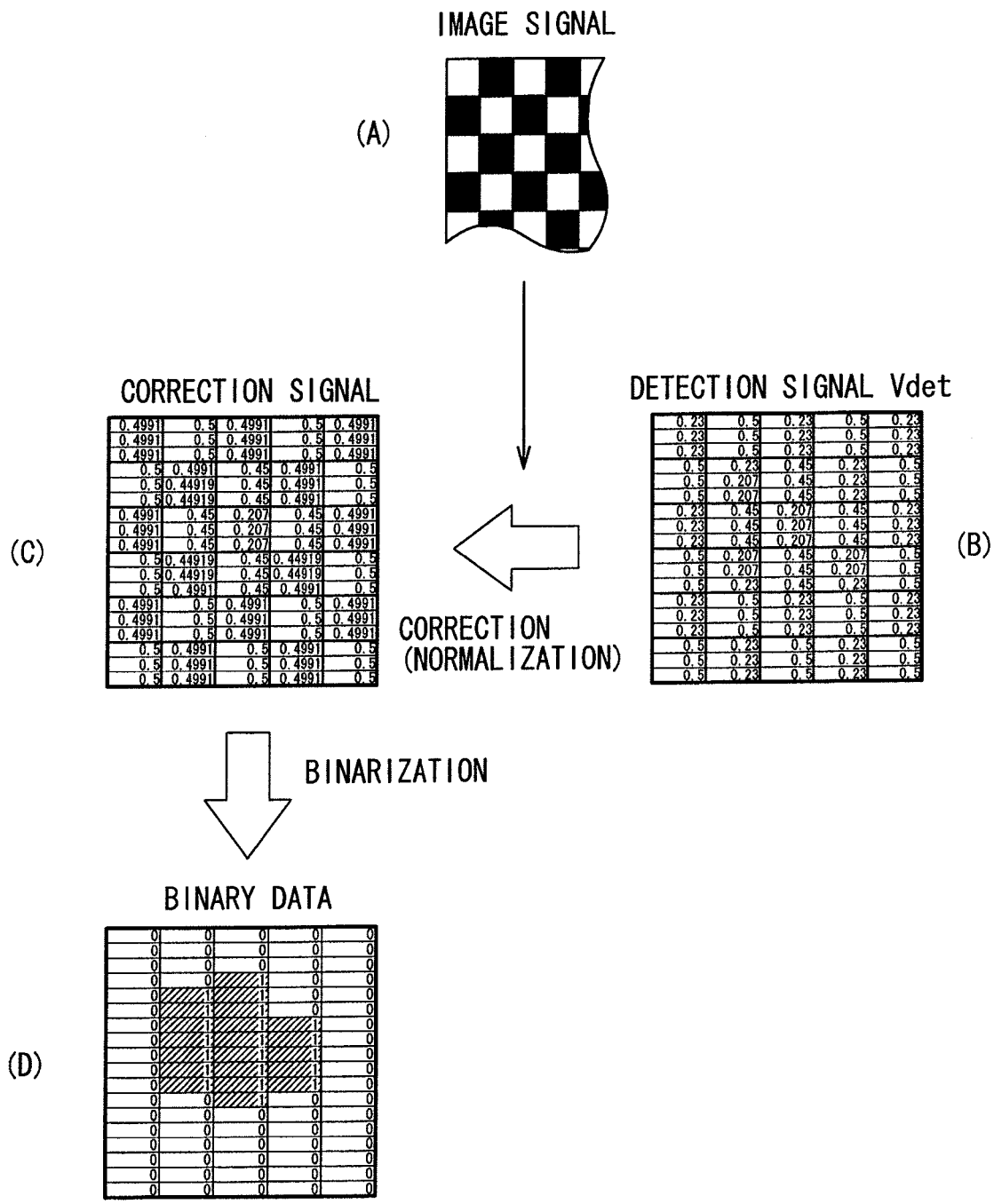
FIG. 17 is a schematic diagram for illustrating the details of the technique 2 of FIG. 16.
Figure 18:
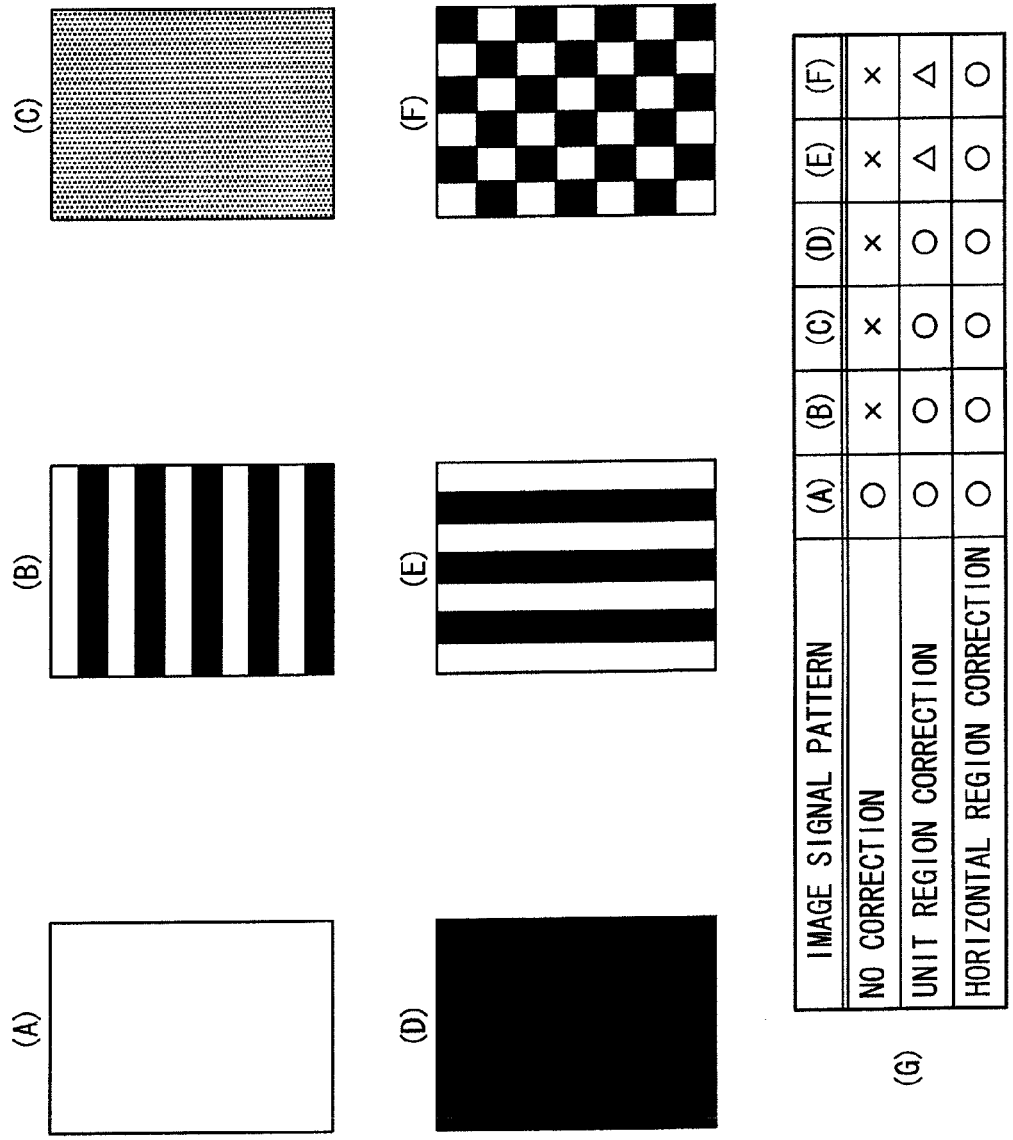
FIG. 18A to 18G are each a diagram showing an exemplary effect of internal noise elimination observed in various image signal patterns with the method for internal noise elimination of the first embodiment.

First of all, similarly to step S11 in the technique 1, the signal processing section 84 acquires such an image signal as Part (A) in FIG. 17, i.e., an image signal at the time of acquisition of a detection signal Vdet (step S21). Also in this example, described is an exemplary case with a black-and-white zigzag pattern of such an image signal of Part (A) in FIG. 17.

Next, similarly to step S14 in the technique 1, the signal processing section 84 acquires such a detection signal Vdet as Part (B) in FIG. 17 detected by the sensor-use detection electrode 44 (step S22).

Figures 14A, 14B:
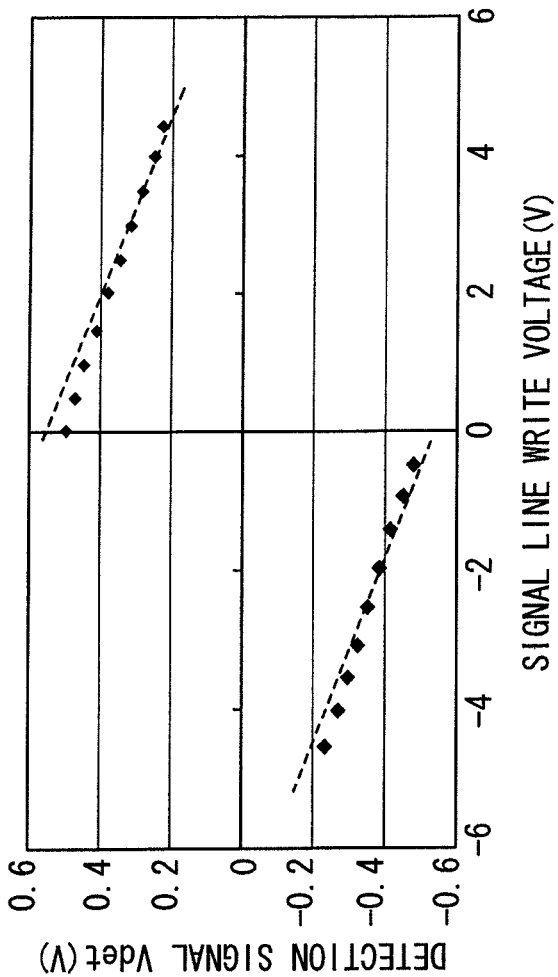
FIGS. 14A and 14B are each a characteristic diagram showing exemplary experimental data about the relationship between a signal-line write voltage and a detection signal voltage.

Next, the signal processing section 84 corrects the detection signal Vdet acquired in step S22 using the image signal acquired in step S21, and the value of the detection signal Vdet including the internal noise in such experimental data as shown in FIGS. 14A and 14B (step S23). For a correction of the detection signal Vdet as such, as Part (C) in FIG. 17, specifically, the value of the acquired detection signal Vdet is normalized for each of the unit correction regions 200 by using the value of the detection signal Vdet including the internal noise corresponding to the gray scale of the image signal. After such a correction, a correction signal is generated for the detection signal Vdet. At this time, similarly to the technique 1, the signal processing section 84 preferably utilizes the correction result in all of the unit correction regions 200 in the direction of the horizontal lines, and re-correct the acquired detection signal Vdet for every unit correction region 200 in the horizontal line.

Next, the signal processing section 84 performs a threshold calculation (binarization) to the correction signal generated in step S24, thereby generating such binary data as Part (D) of FIG. 17 (step S24).

The coordinate extraction section 85 then performs a labeling process to the detection signal (binary data) after the elimination (reduction) of the internal noise (step S25), and then performs the detection operation by extracting the position coordinates (step S26). This is the end of the detection operation with the technique 2 of FIG. 16.

As such, with the technique 2, by a predetermined computation between an image signal during the detection and a detection signal Vdet, the detection signal Vdet is directly corrected without using the correction table. This accordingly leads to advantages of eliminating the need to include the correction table in addition to the advantages achieved with the technique 1.

In the first embodiment described above, a position of object touch is detected based on a detection signal Vdet acquired by the touch detection electrode in response to any change in the capacitor. Also, the detection circuit 8 is so configured as to perform the detection operation by correcting the detection signal Vdet based on the gray scale of an image signal at the time of acquisition of the detection signal Vdet. With such a configuration, there is no more need to use a shielding layer, and the detection operation can be performed with a reduced (eliminated) influence of the internal noise. As such, in a display device provided with the resulting capacitance-type touch sensor, the accuracy of an object detection can be increased without using a shielding layer.

FIG. 18G shows an exemplary effect of the internal noise elimination in various exemplary image signal patterns (FIGS. 18A to 18F) with a method for internal noise elimination of the embodiment. In FIG. 18G, the term "unit region correction" indicates the result of a correction performed to each of the unit correction regions 200. The term "horizontal region correction" indicates the result of a correction performed to each of the unit correction regions 200 in a horizontal line, utilizing the correction result in all of the unit correction regions 200 in the horizontal line. In FIG. 18G, "X" denotes the case where the position detection is not done due to the large amount of internal noise in the detection signal Vdet. Also in FIG. 18G, "Δ" denotes the case where the position detection can be done even with a slight amount of internal noise in the detection signal Vdet, and "○" denotes the case where the position detection can be done with no problem of the internal noise. Such a detection result in FIG. 18G tells that, in the row of "no correction", the image signal pattern of FIG. 18A shows "○" but the remaining image signal patterns all show "X". In the row of "unit region correction", the image signal patterns of FIGS. 18E and 18F both show "Δ" but the remaining image signal patterns of A to D all show "○". Such a result tells that the accuracy of the position detection is increased with the reduction of internal noise. Moreover, in the row of "horizontal region correction", all of the image signal patterns of FIGS. 18A to 18F show "○" including FIGS. 18E and 18F. As such, when the "horizontal region correction" is performed, the internal noise can be reduced still lower compared with when the "unit region correction" is performed, and the accuracy of the position detection is increased even higher.

Modified Example of First Embodiment

Described in the first embodiment above is the case that the above-described noise data is the experimental data made ready in advance by a predetermined experiment, and a modified example as below is also a possibility. In the modified example below, the noise data is created based on an internal-noise detection signal coming from the sensor-use detection electrode 44 with a supply of a predetermined detection pattern signal. This detection pattern signal is the one obtained from a display control circuit (source driver that is not shown) in a blanking period that will be described later.

Figure 19:
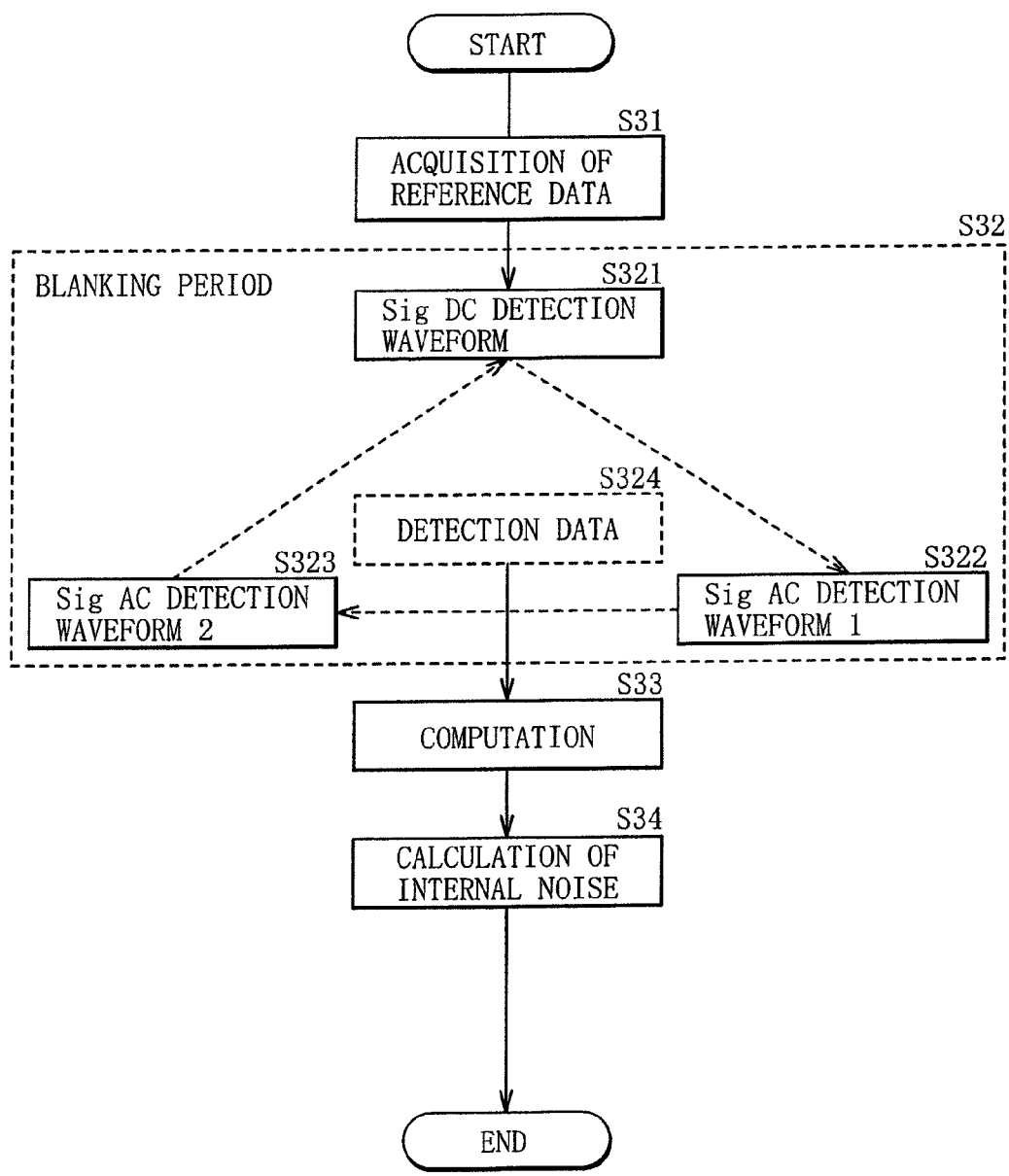
FIG. 19 is a flowchart of an exemplary method for internal noise calculation, i.e., method for correction table creation, in a modified example of the first embodiment.
Figure 20:
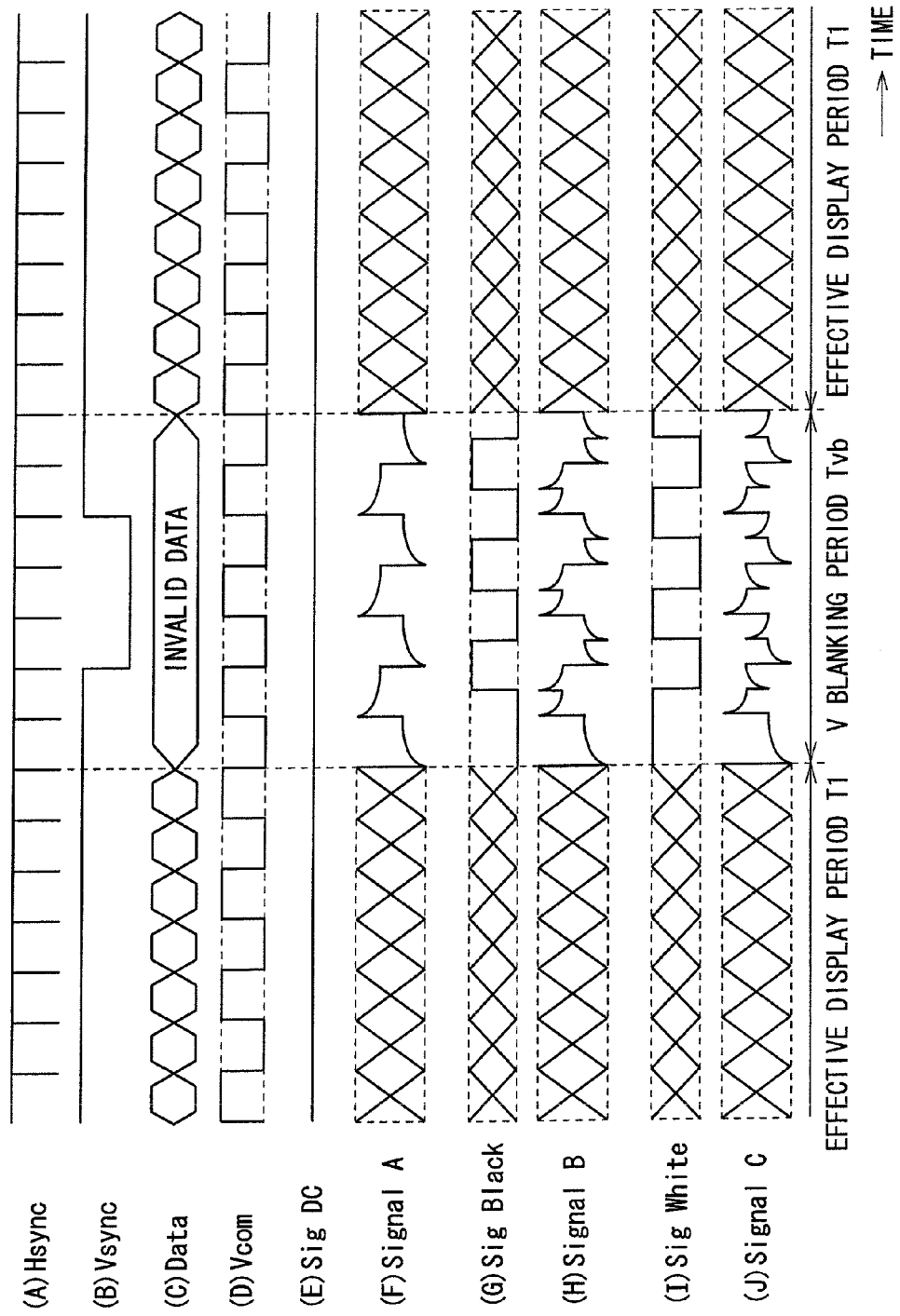
FIG. 20 is a timing waveform diagram for illustrating the method for internal noise calculation during a vertical blanking period.
Figure 21:
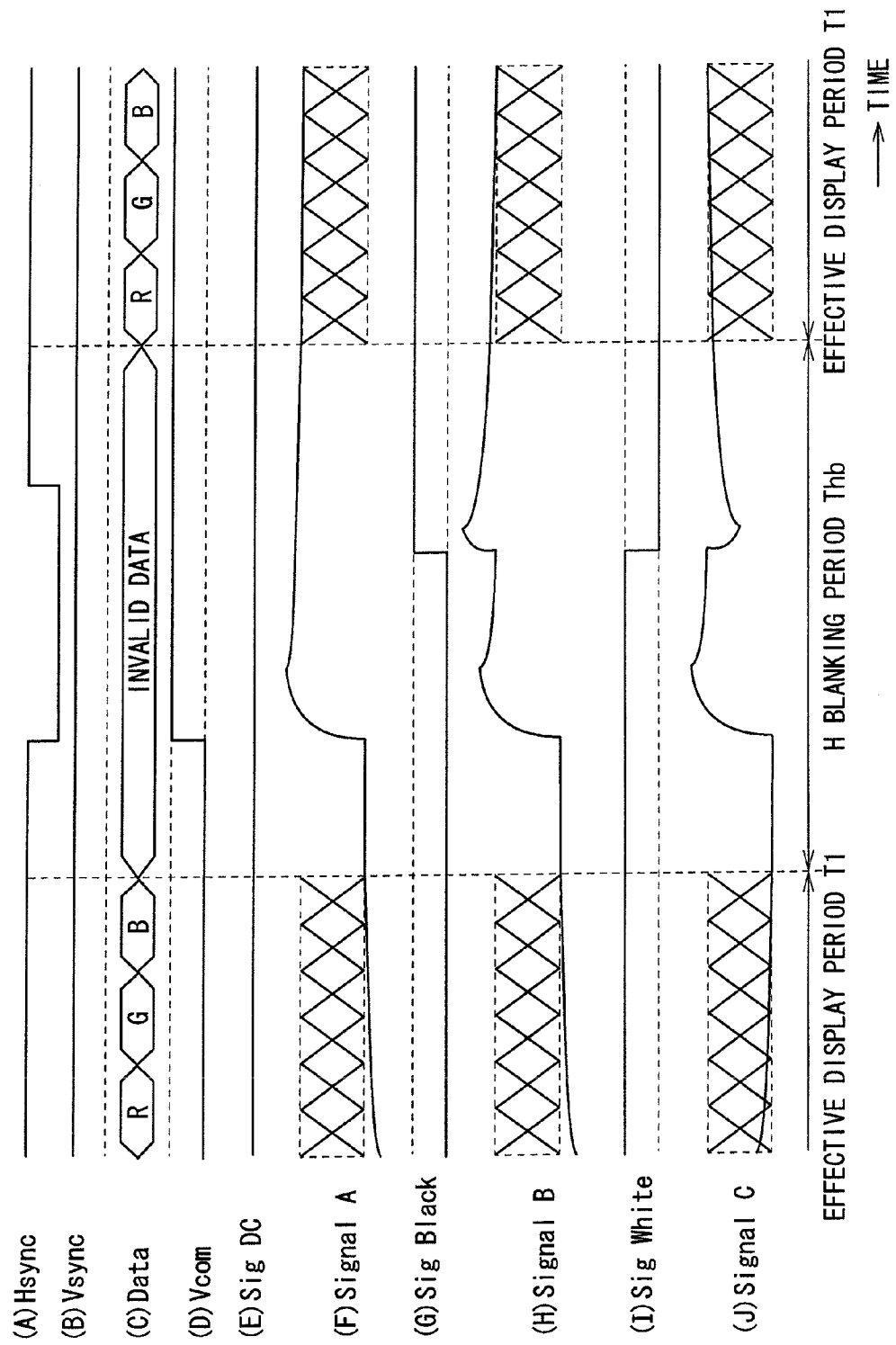
FIG. 21 is a timing waveform diagram for illustrating the method for internal noise calculation during a horizontal blanking period.

To be specific, in this modified example, in the components in the detection circuit 8, i.e., the signal processing section 84, the frame memory 86, and the coordinate extraction section 85, the amount of internal noise is calculated in accordance with the gray scale of an image signal as exemplarily shown in FIGS. 19 to 21. To be more specific, in the signal processing section 84 and the frame memory 86, an internal-noise detection signal is acquired from the sensor-use detection electrode 44 in a blanking period. The blanking period is in between effective display periods T1, and is either a vertical (V) blanking period Tvb or a horizontal (H) blanking period Thb. As will be described later, this internal-noise detection signal is acquired from the sensor-use detection electrode 44 with a supply of a predetermined detection pattern signal (image signal in a predetermined gray scale that will be described later) by the source driver that is not shown.

FIG. 19 is a flowchart of an exemplary method for internal noise calculation in this modified example. FIGS. 20 and 21 are each a timing waveform diagram showing an exemplary method for internal noise calculation in a vertical (V) blanking period or in a horizontal (H) blanking period, which will be described below. In FIGS. 20 and 21, (A) indicates a horizontal synchronizing signal Hsync, (B) indicates a vertical synchronizing signal Vsync, (C) indicates an image signal Data, and (D) indicates a common drive signal Vcom. Also in FIGS. 20 and 21, (E), (G), and (I) each indicate a detection pattern signal for a supply to the signal lines (source lines) 25 in the V blanking period or in the H blanking period, i.e., "Sig DC" denotes a DC signal at a fixed potential, "Sig Black" denotes a black writing signal, and "Sig White" denotes a white writing signal. Also in FIGS. 20 and 21, (F), (H), and (I) respectively indicate detection signals Vdet (noise detection signals) as results of the supplies of "Sig DC", "Sig Black", and "Sig White".

First of all, the signal processing section 84 and the frame memory 86 acquire predetermined reference data (S31 of FIG. 19). This reference data is about a detection signal Vdet, which is acquired with conditions when the DC signal at a fixed potential, i.e., "Sig DC", is used, for example. The conditions here include that there is no touching or adjacent non-detection object, and there is no external noise caused by the external environment.

Next, the signal processing section 84 and the frame memory 86 acquire an internal-noise detection signal from the sensor-use detection electrode 44 in the blanking period, i.e., the V blanking period Tvb or the H blanking period Thb (step S32). To be specific, in this example, in a plurality of blanking periods, an internal-noise detection signal is acquired from a plurality of various detection pattern signals, i.e., a fixed-potential signal, and image signals of varying gray scales (steps S321 to S324).

To be more specific, first in the blanking period, when a fixed-potential DC signal "Sig DC" is applied to the source lines 25, the influence of internal noise can be eliminated because the signal lines do not vary in potential, which is the main reason of the internal noise. Accordingly, the resulting detection waveform ("Signal A") acquired from the sensor-use detection electrode 44 can be free from the influence of the internal noise (steps S321 and S324, and (E) and (F) in FIGS. 20 and 21).

On the other hand, when a black writing signal (black image signal) "Sig Black" is applied to the source lines 25 in the blanking period, the amount of internal noise corresponding to the display of such a black image signal can be acquired in addition to the waveform of the detection signal Vdet with no influence over the source lines 25. That is, provided from the sensor-use detection electrode 44 is the detection waveform ("Signal B") of the internal-noise detection signal corresponding to such a gray scale (steps S322 and S324, and (G) and (H) in FIGS. 20 and 21).

Similarly, when a white writing signal (white image signal) "Sig White" is applied to the source lines 25 in the blanking period, the amount of internal noise corresponding to the display of such a white image signal can be acquired in addition to the waveform of the detection signal Vdet with no influence over the source lines 25. That is, provided from the sensor-use detection electrode 44 is the detection waveform ("Signal C") of the internal-noise detection signal corresponding to such a gray scale (steps S323 and S324, and (I) and (J) in FIGS. 20 and 21).

As such, in step S32, the waveforms of the internal-noise detection signal can be identified, i.e., the waveform free from the influence of internal noise ("Signal A"), the waveform with internal noise during black display ("Signal B"), and the waveform with internal noise during white display ("Signal C"). The resulting identified waveforms can be used in the computation below.

Next, the signal processing section 84 and the frame memory 86 perform a predetermined computation (difference computation) based on the detection waveforms acquired in step S32, i.e., "Signal A" to "Signal C" in this example (step S33), thereby calculating the amount of internal noise (step S34). This is the end of the process of internal noise calculation of FIG. 19.

As such, in this modified example, the noise data is created based on the internal-noise detection signal acquired from the sensor-use detection electrode 44 with a supply of a predetermined detection pattern signal from the display control circuit in a blanking period. Accordingly, compared with the first embodiment described above, the acquired amount of internal noise can be acquired more properly (at better timing).

2. Second Embodiment

Described next is a second embodiment of the invention. Unlike the first embodiment described above, in this second embodiment, a display element is exemplified as a liquid crystal element in the lateral electric field mode.

[Exemplary Configuration of Display Device 1B]

Figure 22:
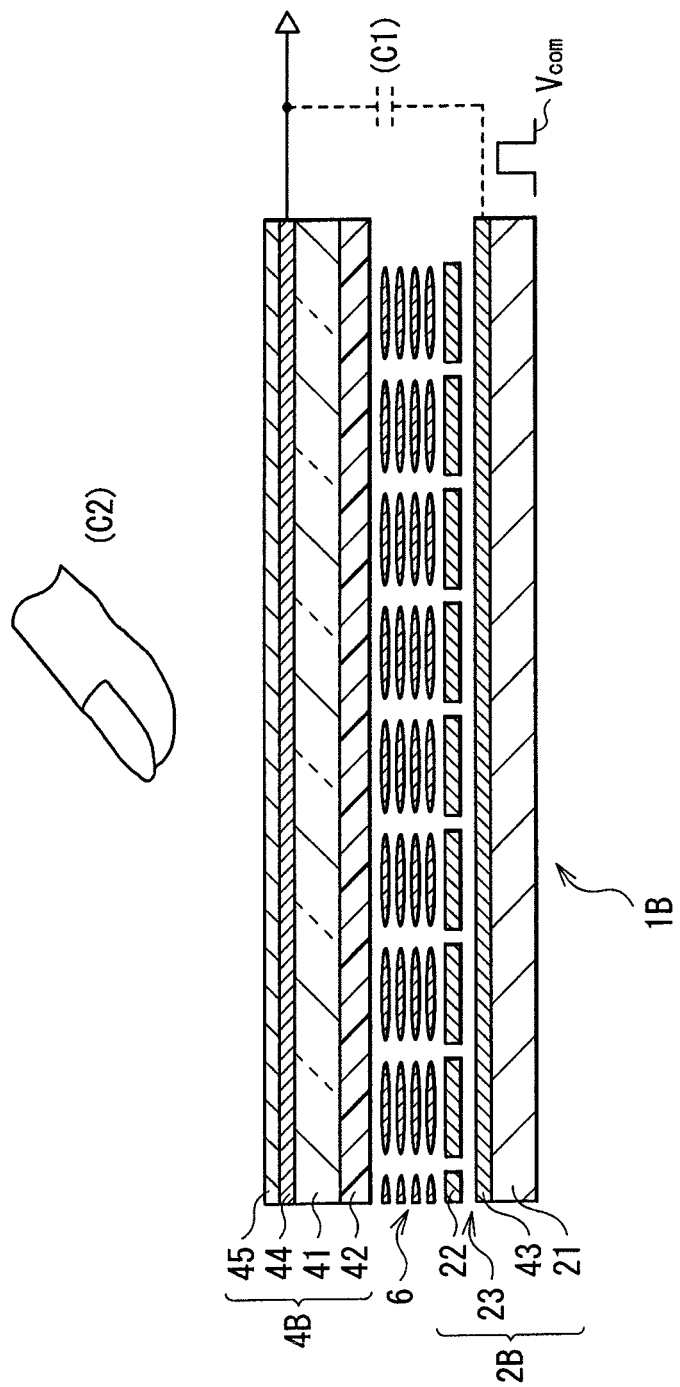
FIG. 22 is a cross-sectional view of a touch-sensor-provided display device of a second embodiment of the invention, showing the schematic cross-sectional configuration thereof.
Figure 23B:
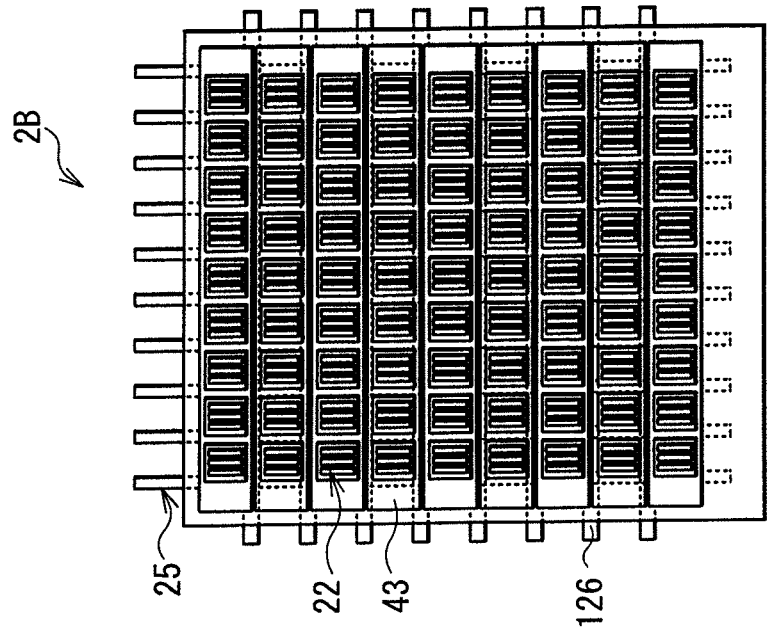
FIGS. 23A and 23B are respectively a cross-sectional view and a plan view of a part of a pixel substrate in the display device of FIG. 22, showing the detailed configuration thereof.
Figure 23A:
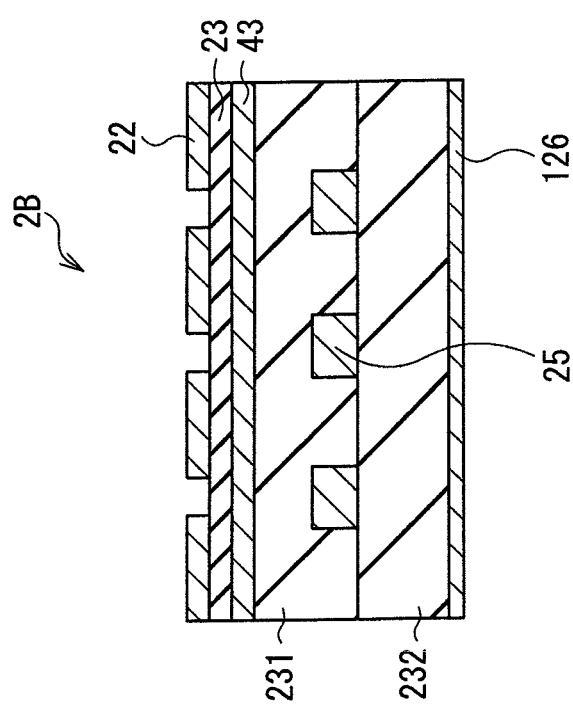
Figure 24B:
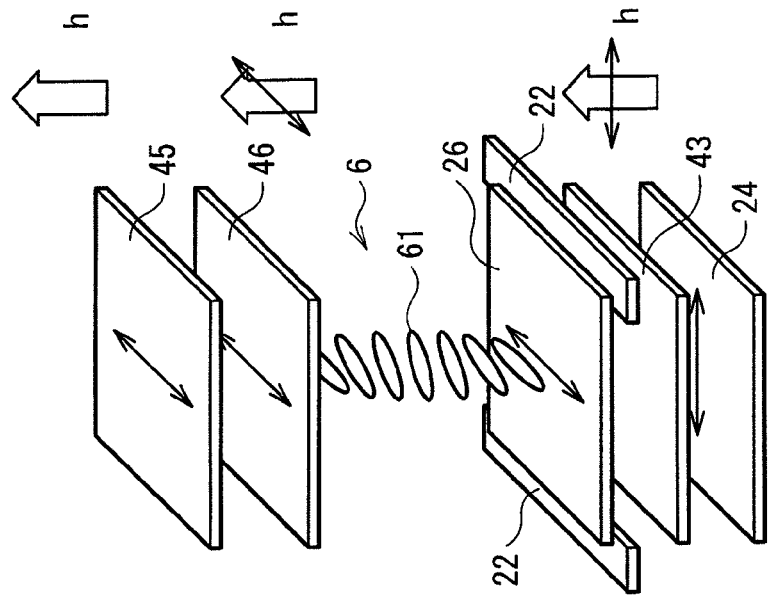
FIGS. 24A and 24B are each an enlarged perspective view of a main part of the display device of FIG. 22.
Figure 24A:
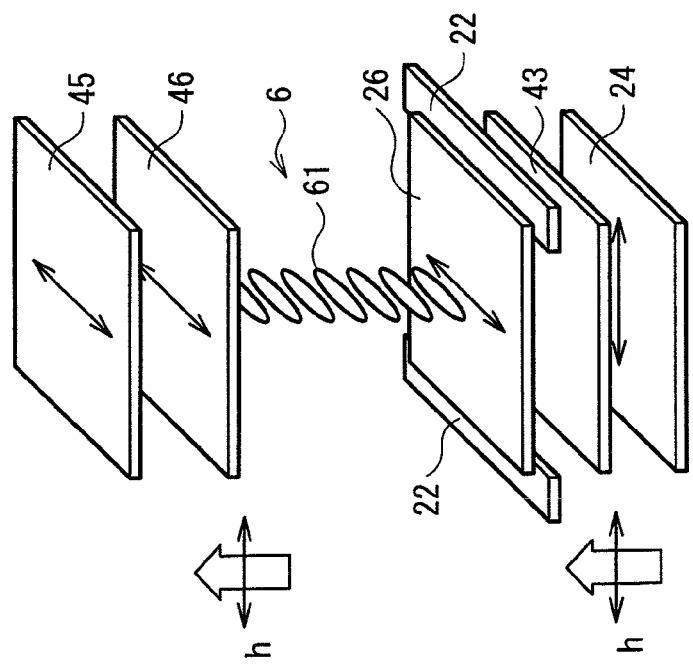

FIG. 22 is a diagram showing the cross-sectional configuration of a main part of a touch-sensor-provided display device 1B of this embodiment. FIGS. 23A and 23B each show the detailed configuration of a pixel substrate (pixel substrate 2B that will be described later) in this display device 1B. More specifically, FIG. 23A shows the cross-sectional configuration of the display device 1B, and FIG. 23B shows the configuration thereof in a planar view. FIGS. 24A and 24B are each a perspective view of the display device 1B, showing the configuration thereof. Note that, in these drawings, any component same as that in FIG. 4 or others in the first embodiment above is provided with the same reference numeral, and is not described if appropriate.

The display device 1B of this embodiment includes the pixel substrate 2B, an opposing substrate 4B, and the liquid crystal layer 6. The opposing substrate 4B is disposed to oppose the pixel substrate 2B, and the liquid crystal layer 6 is inserted in between the pixel substrate 2B and the opposing substrate 4B.

The pixel substrate 2B is provided with the TFT substrate 21, the common electrode 43 disposed on the TFT substrate 21, and a plurality of pixel electrodes 22 arranged in matrix on the column electrode 43 via an insulating layer 23. The TFT substrate 21 is formed with, additionally to a display driver and TFTs (not shown) for driving the pixel electrodes 22, a wiring pattern including the signal lines (source lines) 25 and the gate lines 126, for example (FIGS. 23A and 23B). The source lines are those for supplying image signals to the pixel electrodes, and the gate lines are those for driving the TFTs. The TFT substrate 21 is also formed with the detection circuit 8 (FIG. 8) for a touch detection operation. The common electrode 43 is used also as a sensor-use drive electrode configuring a part of the touch sensor in charge of a touch detection operation, and corresponds to the drive electrode E1 of FIG. 1A.

The opposing substrate 4B is configured by the glass substrate 41, and the color filter 42 formed on one surface of the glass substrate 41. The other surface of the glass substrate 41 is formed with the sensor-use detection electrode 44, and on the sensor-use detection electrode 44, the polarizing plate 45 is provided. Such a sensor-use detection electrode 44 configures a part of the touch sensor, and corresponds to the detection electrode E2 of FIG. 1A. As shown in FIG. 5, the sensor-use detection electrode 44 is divided into a plurality of electrode patterns. The sensor-use detection electrode 44 may be provided directly on the opposing substrate 4B by a thin-film process, or may be provided indirectly thereon. If this is the case, the touch detection electrode 44 may be formed on a film substrate that is not shown, and the resulting film substrate formed thereon with the touch detection electrode 44 may be attached to the surface of the opposing substrate 4B. Such a resulting film substrate may be attached not only in between the glass and the polarizing plate but to the upper surface of the polarizing plate, or may be created in the film configuring the polarizing plate.

The common electrode 43 is provided with, from the TFT substrate 21, a common drive signal Vcom of the AC rectangular waveform. This common drive signal Vcom is originally for defining a display voltage of the respective pixels in addition to a pixel voltage for application to the pixel electrodes 22. Such a common drive signal Vcom is used also as a touch-sensor drive signal, and corresponds to the AC rectangular wave Sg coming from the drive signal source S of FIG. 1B.

The liquid crystal layer 6 is for modulating light that goes therethrough depending on in which state the electric field is. For the liquid crystal layer 6, used is a liquid crystal material in a lateral electric field mode, e.g., FFS (Fringe Field Switching) mode, and IPS (In-Plane Switching) mode.

The common electrode 43 on the pixel substrate 2B and the sensor-use detection electrode 44 on the opposing substrate 4B respectively have configurations similar to those of FIG. 5. These electrodes are each configured as a plurality of electrode patterns, and the electrode patterns of the common electrode 43 are extended to intersect with those of the sensor-use detection electrode 44.

By referring to FIGS. 24A and 24B, a more detailed description is provided. In an FFS-mode liquid crystal element in this example, the common electrode 43 formed on the pixel substrate 2B is provided thereon with the pixel electrodes 22 via the insulating layer 23. The pixel electrodes 22 are those patterned like teeth of a comb, and an alignment film 26 is so formed as to cover the pixel electrodes 22. Between the alignment film 26 and another alignment film 46 provided on the side of the opposing substrate 4B, the liquid crystal layer 6 is sandwiched. The two polarizing plates 24 and 45 are disposed in crossed nicols. The rubbing direction of the two alignment films 26 and 46 is the same as the light-transmission axis of either the polarizing plate 24 or 45. Exemplified in FIGS. 24A and 24B is a case where the rubbing direction is the same as the light-transmission axis of the polarizing plate 45 on the light-exit side. Also in this example, the rubbing direction of the two alignment films 26 and 46 and the direction of the light-transmission axis of the polarizing plate 45 are both so set as to be almost parallel to the extending direction of the pixel electrodes 22 (longitudinal direction of comb teeth) in the range of defining the direction for the liquid crystal molecules to rotate.

[Advantages and Effects of Display Device 1B]

Described next are the advantages and effects of the display device 1B of the second embodiment.

Figure 25A:
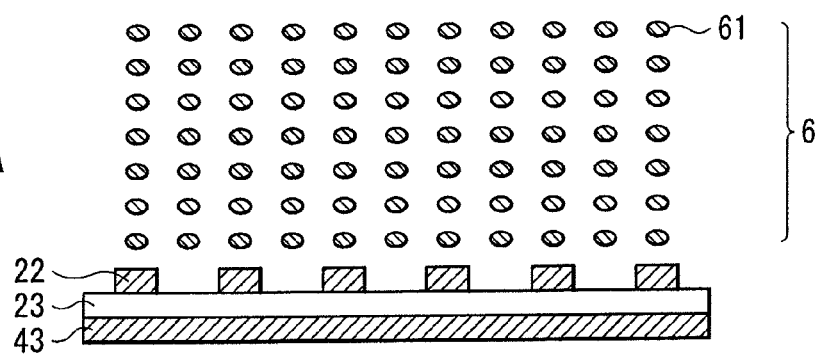
FIGS. 25A and 25B are each a cross-sectional view for illustrating the operation of the display device of FIG. 22.
Figure 25B:
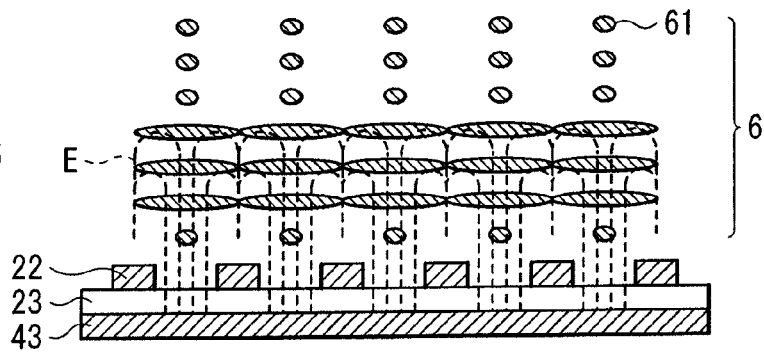

By referring to FIGS. 24A to 25B, described first are the principles of display operation of an FFS-mode liquid crystal element. FIGS. 25A and 25B are each a diagram showing an enlarged cross-sectional view of a main part of the liquid crystal element. Specifically, FIG. 25A shows the state of the liquid crystal element when no electric field is applied, and FIG. 25B shows the state thereof when an electric field is applied.

In the state with no voltage application between the common electrode 43 and the pixel electrodes 22 (FIGS. 24A and 25A), the axis of each liquid crystal molecule 61 configuring the liquid crystal layer 6 is orthogonal to the light-transmission axis of the polarizing plate 24 on the light-incident side, and is parallel to the light-transmission axis of the polarizing plate 45 on the light-exit side. With such a configuration, an incident light "h" passing through the light-incident-side polarizing plate 24 reaches the light-exit-side polarizing plate 45 without causing a phase difference in the liquid crystal layer 6, and is absorbed therein so that the display becomes in black. On the other hand, with a voltage application between the common electrode 43 and the pixel electrodes 22 (FIGS. 24B and 25B), the alignment direction of the liquid crystal molecules 61 is rotated to tilt against the extending direction of the pixel electrodes 22 by a lateral electric field E generated between the pixel electrodes. At this time, the intensity of the electric field during white display is optimized so as to rotate by about 45 degrees the liquid crystal molecules 61 in the center of the liquid crystal layer 6 in the thickness direction. As a result, the incident light "h" passing through the light-incident-side polarizing plate 24 causes a phase difference while passing through the liquid crystal layer 6, and thus is linearly polarized with a 90-degree rotation. The resulting light passes through the light-exit-side polarizing plate 45 so that the resulting display will be in white.

Described next are the display control operation and the touch detection operation in the display device 1B. These operations are similar to those in the first embodiment described above, and thus are not described if appropriate.

A display driver (not shown) of the pixel substrate 2B line-sequentially supplies a common drive signal Vcom to the electrode patterns of the common electrode 43. The display driver also supplies an image signal to the pixel electrodes 22 over the source lines 25, and in synchronization therewith, line-sequentially controls switching of the TFTs of the pixel electrodes over the gate lines 126. As a result, the liquid crystal layer 6 is applied with an electric field for every pixel so that the layer is modulated in terms of liquid crystalline state. The electric field here is in the lateral direction, i.e., direction parallel to the substrate, defined by the common drive signal Vcom and the image signals. In this manner, display is made by so-called inversion driving.

On the other hand, on the side of the opposing substrate 4B, the electrode patterns of the common electrode 43 are applied in order with the common drive signal Vcom in a time-division manner. With such application of signals, the capacitor elements C (C11 to C1n) of a line formed to the intersection portions between the signal-applied electrode patterns of the common electrode 43 and the electrode patterns of the sensor-use detection electrode 44 are charged/discharged. As a result, the electrode patterns of the sensor-use detection electrode 44 each output a detection signal Vdet of a size corresponding to the value of the capacitor elements C1. When the user's finger is not touching the surface of the opposing substrate 4B, the detection signal Vdet is almost constant in size. When the user's finger touches somewhere on the surface of the opposing substrate 4B, any of the capacitor elements C1 originally formed to the touched portion is added with a capacitor element C2 by the finger. As a result, at the point in time of the scanning of the touched portion, the detection signal Vdet becomes smaller in value than that for the remaining portions on the surface of the opposing substrate 4B. The detection circuit 8 (FIG. 8) then compares such a detection signal Vdet with a threshold voltage Vth, and when determining that the detection signal Vdet is smaller than the threshold voltage Vth, the detection circuit 8 determines the portion as the touched portion. The touched portion is identified by the application timing of the common drive signal Vcom, and the detection timing of the detection signal Vdet smaller than the threshold voltage Vth.

As such, in the second embodiment, similarly to the first embodiment described above, the common electrode 43 originally provided to the liquid crystal display element is used also as one of a pair of electrodes for the use of the touch sensor, i.e., a pair of drive electrode and detection electrode. Also in the display device 1B of the present embodiment, a common drive signal Vcom being a display drive signal is used also as a touch-sensor drive signal to configure a capacitance-type touch sensor. With such a configuration, the resulting capacitance-type touch sensor needs to newly include only the sensor-use detection electrode 44, and has no need to newly provide a touch-sensor drive signal. The configuration is thus favorably simplified.

Also in the second embodiment, the detection circuit 8 similar to that described in the first embodiment above is provided, thereby leading to the advantages similar to those achieved in the first embodiment above, i.e., in a display device provided with the resulting capacitance-type touch sensor, the accuracy of an object detection can be favorably increased without using a shielding layer.

Especially, in this second embodiment, the common electrode 43 serving as a touch-sensor drive electrode is provided on the side of the pixel substrate 2B, i.e., on the TFT substrate 21. Such a configuration considerably eases the supply of a common drive signal Vcom from the TFT substrate 21 to the common electrode 43, and enables to form any needed circuits, electrode patterns, and wiring patterns mainly on the pixel substrate 2 so that the integration of circuits can be favorably achieved. Accordingly, unlike in the first embodiment, there is no more need to form a supply path (contact conductive column 7) from the side of the pixel substrate 2 to the side of the opposing substrate 4 for a common drive signal Vcom so that the resulting configuration is more simplified.

Furthermore, as described in the foregoing, the common electrode 43 serving as a touch-sensor drive electrode is provided on the side of the pixel substrate 2B, and this pixel substrate 2B is also provided thereon with the source lines 25 and the gate lines 126. Such a configuration may be susceptible specifically to the influence of internal noise described above. In consideration thereof, the display device 1B of the second embodiment greatly benefits from the advantages of the detection operation performed with a reduced influence of the internal noise.

The detection circuit 8 (FIG. 8) may be formed in the region in the vicinity of the opposing substrate 4B, i.e., in a non-display region or a frame region, or in the region in the vicinity of the pixel substrate 2B. Herein, forming the detection circuit 8 on the pixel substrate 2B favorably leads to the integration of circuits achieved with various circuits originally formed on the pixel substrate 2 for display control use.

Modified Example of Second Embodiment

Described in the second embodiment above is the case that the sensor-use detection electrode 44 is provided on the surface side of the glass substrate 41, i.e., side opposite to the liquid crystal layer 6, and a modified example as below is also a possibility.

Figure 26:
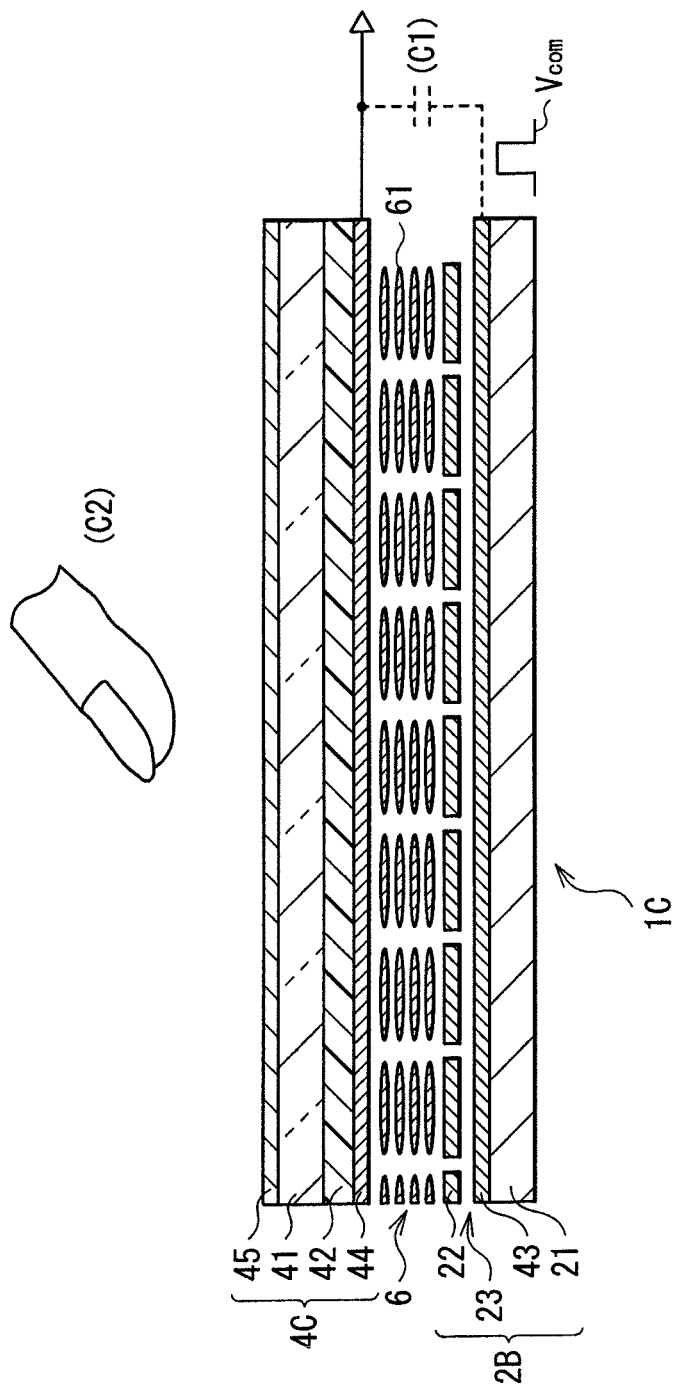
FIG. 26 is a cross-sectional view of a touch-sensor-provided display device of a modified example of the second embodiment, showing the schematic cross-sectional configuration thereof.

As an example, like a display device 1C of FIG. 26, in an opposing substrate 4C, the sensor-use detection electrode 44 may be disposed not on the side of the color filter 42 but on the side of the liquid crystal layer 6.

Figure 27:
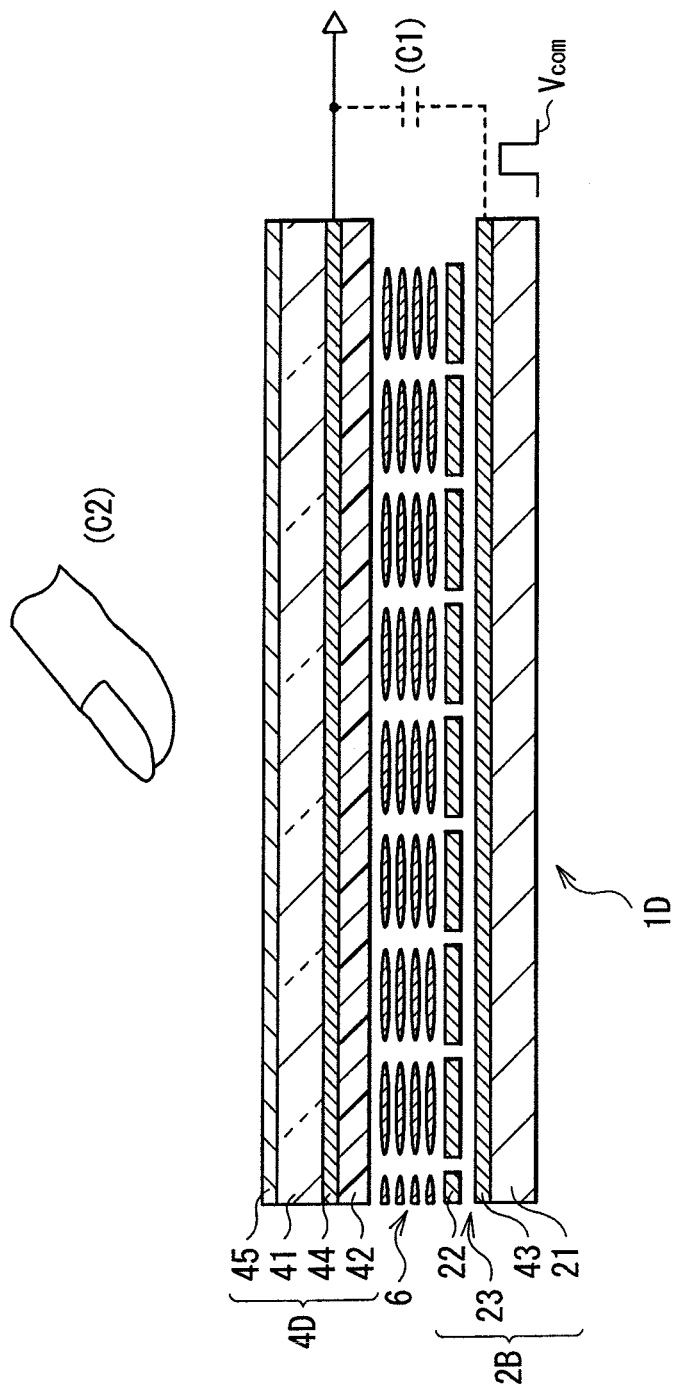
FIG. 27 is a cross-sectional view of a touch-sensor-provided display device of another modified example of the second embodiment of the invention, showing the schematic cross-sectional configuration thereof.

Alternatively, like a display device 1D of FIG. 27, in an opposing substrate 4D, the sensor-use detection electrode 44 may be disposed between the glass substrate 41 and the color filter 42. If this is the configuration, in a lateral electric field mode, when any electrode is disposed in the vertical direction, the electric field is resultantly applied in the vertical direction. As a result, the liquid crystal rises and the viewing angle or others may be greatly reduced. In consideration thereof, like this display device 1D, if the sensor-detection electrode 44 is disposed with a dielectric such as color filter 42 or others sandwiched therebetween, such a problem is greatly reduced.

3. Application Examples

By referring to FIGS. 28 to 32G, described are application examples of the touch-sensor-provided display devices described in the embodiments and modified examples above. The display devices of the above embodiments and others can be applied for use in any electronic unit in various types of fields, e.g., television unit, digital camera, notebook personal computer, mobile terminal device such as mobile phone, and camcorder. In other words, the display devices of the above embodiments and others can be applied for use in any electronic unit in various types of fields of displaying externally-provided video signals or internally-generated video signals as images or videos.

Application Example 1

Figure 28:
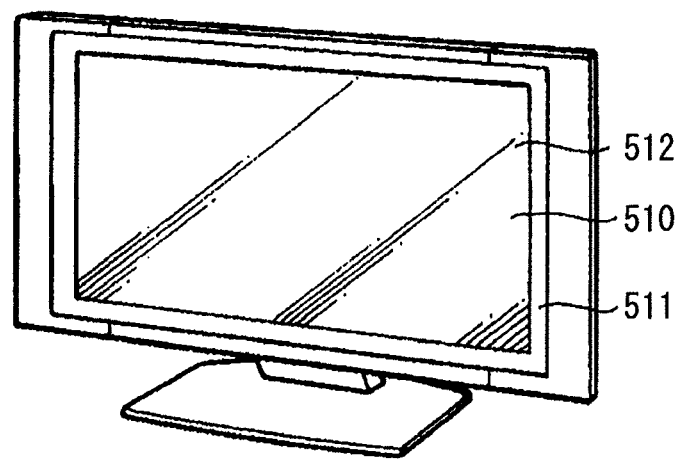
FIG. 28 is a perspective view illustrating the outer appearance of an application example 1 of the display devices in the above embodiments or others.

FIG. 28 shows the outer view of a television unit for application use of the display devices of the above embodiments and others. This television unit includes a video display screen section 510 having a front panel 511 and a filter glass 512, for example. This video display screen section 510 is configured by the display devices of the above embodiments and others.

Application Example 2

Figure 29A:
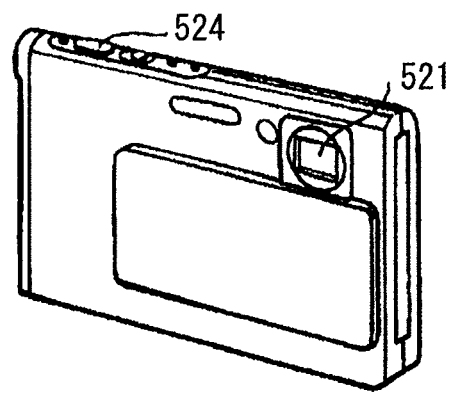
FIG. 29A is a perspective view of an application example 2, showing the outer appearance thereof viewed from the front side.
Figure 29B:
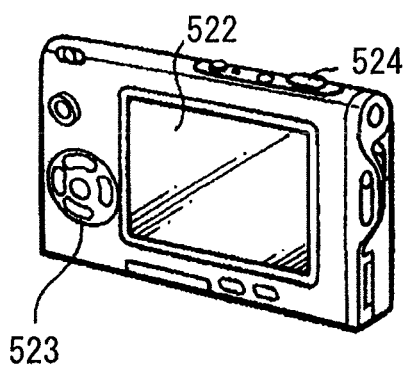
FIG. 29B is another perspective view of the application example 2, showing the outer appearance thereof viewed from the rear side.

FIGS. 29A and 29B each show the outer view of a digital camera for application use of the display devices of the above embodiments and others. This digital camera includes a light-emitting section 521 for flash use, a display section 522, a menu switch 523, and a shutter button 524, for example. The display section 522 is configured by the display devices of the above embodiments and others.

Application Example 3

Figure 30:
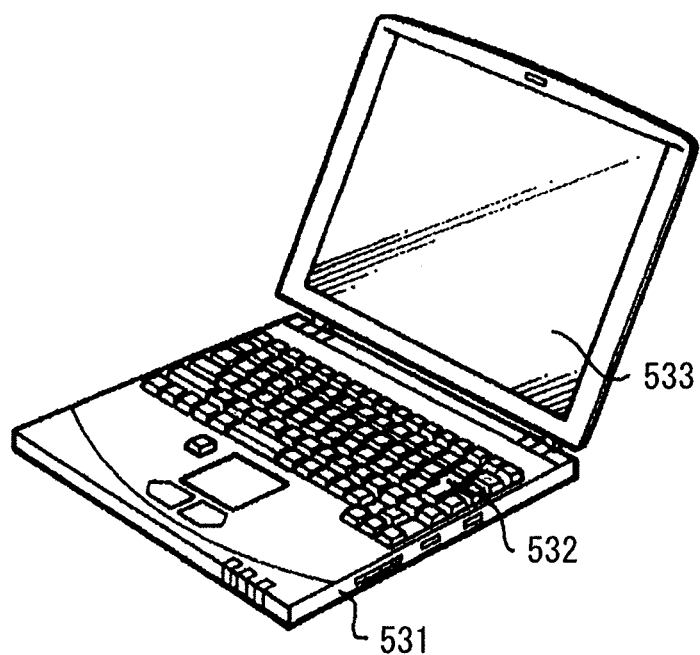
FIG. 30 is a perspective view of an application example 3, showing the outer appearance thereof.

FIG. 30 shows the outer view of a notebook personal computer for application use of the display devices of the above embodiments and others. This notebook personal computer includes a main body 531, a keyboard 532, and a display section 533, for example. The keyboard 532 is for an input operation of texts and others, and the display section 533 is for displaying thereon images. This display section 533 is configured by the display devices of the above embodiments and others.

Application Example 4

Figure 31:
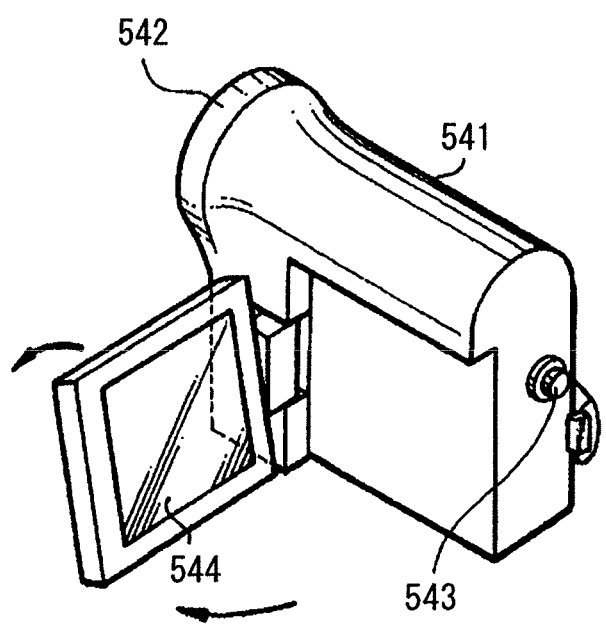
FIG. 31 is a perspective view of an application example 4, showing the outer appearance thereof.

FIG. 31 shows the outer view of a camcorder for application use of the display devices of the above embodiments and others. This camcorder includes a body section 541, a lens 542, a start/stop switch 543 for image capturing, and a display section 544, for example. The lens 542 is provided on the front side surface of the body section 541 for image capturing of objects. The display section 544 is configured by the display devices of the above embodiments and others.

Application Example 5

FIGS. 32A to 32G each show the outer view of a mobile phone for application use of the display devices of the above embodiments, and others. This mobile phone is configured by an upper chassis 710 and a lower chassis 720 coupled together by a coupling section (hinge section) 730, and includes a display 740, a sub display 750, a picture light 760, and a camera 770, for example. The display 740 or the sub display 750 is configured by the display devices of the above embodiments, and others.

Other Modified Examples

While the invention has been described in detail with the embodiments, the modified examples, and the application examples, the foregoing description is in all aspects illustrative and not restrictive, and numerous other modifications and variations can be surely made.

With the technique for noise reduction described in the modified example of the first embodiment, for detection of any internal noise, the detection may be made at only one point (at one timing) in a detection signal Vdet, for example. If this is the case, the detection is preferably performed immediately after the polarity reversal of a common drive signal Vcom.

In the second embodiment above, described is a liquid crystal element exemplarily in an FFS mode as a lateral electric field mode. This is surely not restrictive, and a liquid crystal material in the IPS mode is also applicable.

In the embodiments above and others, described is the display device in which a display element is a liquid crystal display element. Alternatively, any other types of display element, e.g., organic EL (ElectroLuminescence) element, can be also used for the display device.

Also in the embodiments above and others, described is the case where a touch sensor is provided inside of a display device, i.e., touch-sensor-provided display device. The touch sensors according to the embodiments above and others of the invention are surely not restrictive thereto, and may be used to the outside of the display device, i.e., externally-provided touch sensor, for example.

In addition thereto, the process procedure in the embodiments and others above may be performed by hardware or by software. When the process procedure is performed by software, a program configuring the software is installed into a general-purpose computer, for example. Such a program may be recorded in advance in a recording medium provided in the computer.

The present application contains subject matter related to that disclosed in Japanese Priority Patent Application JP 2009-123261 filed in the Japan Patent Office on May 21, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device, comprising:
   a plurality of display pixel electrodes;
   a common electrode provided to oppose the display pixel electrodes;
   a display function layer having an image display function;
   a display control circuit performing image display control by applying a pixel voltage based on an image signal to each of the display pixel electrodes and applying a common drive voltage to the common electrode, the common drive voltage being reversed in polarity in synchronization with a drive cycle of the image display control;
   a touch detection electrode cooperating with the common electrode to form a capacitor; and
   a touch detection circuit performing a detection operation of detecting an external proximity object, based on a detection signal obtained from the touch detection electrode in response to the common drive voltage applied to the common electrode,
   wherein the touch detection circuit corrects the detection signal obtained from the touch detection electrode with use of the image signal and reference noise data, the reference noise data based on a gray scale value of the image signal and a detection signal value which are correlated with each other, the value of the detection signal including internal noise resulting from the image-signal writing operation for image display with the gray scale value;
   wherein
   the touch detection circuit prepares a correction table configured of gray scale values for the image signals actually input and the detection signal values given by the reference noise data which are correlated with each other for every predetermined pixel region including a predetermined number of the display pixel electrodes, and the touch detection circuit corrects the detection signal obtained from the touch detection electrode with use of the correction table.

2. The display device according to claim 1, wherein the touch detection circuit generates a correction signal for the detection signal obtained from the touch detection electrode by performing, for each of the pixel regions, a subtraction or division between the value of the detection signal in the correction table and the value of the detection signal obtained from the touch detection electrode.

3. The display device according to claim 1, wherein the common electrode and the touch detection electrode are each divided into a plurality of electrode patterns each having a stripe shape, and
   the pixel region has a horizontal length equal to a stripe pitch of the electrode patterns configuring the touch detection electrode, and has a vertical length equal to a width of the electrode pattern in the common electrode, each of the electrode patterns configuring the touch detection electrode located in a center of the horizontal length of the pixel region.

4. The display device according to claim 3, wherein the touch detection circuit re-corrects the detection signal obtained from the touch detection electrode in each of the pixel regions along a horizontal line, utilizing results of separately performed corrections for all of the pixel regions along the horizontal line.

5. The display device according to claim 1, wherein the touch detection circuit corrects the detection signal obtained from the touch detection electrode through normalizing, for each of the pixel regions, the value of the detection signal obtained from the touch detection electrode with use of the value of the detection signal in the reference noise data corresponding to the gray scale value of the image signal.

6. The display device according to claim 5, wherein the common electrode and the touch detection electrode are each divided into a plurality of electrode patterns each having a stripe shape, and
   the pixel region has a horizontal length equal to a stripe pitch of the electrode patterns configuring the touch detection electrode, and has a vertical length equal to a width of the electrode pattern in the common electrode, each of the electrode patterns configuring the touch detection electrode located in a center of the horizontal length of the pixel region.

7. The display device according to claim 6, wherein the touch detection circuit re-corrects the detection signal obtained from the touch detection electrode in each of the pixel regions along a horizontal line, utilizing results of corrections performed separately in all of the pixel regions along the horizontal line.

8. The display device according to claim 1, wherein the reference noise data is data created, in a blanking period between effective display periods, based on an internal-noise detection signal obtained from the touch detection electrode in response to a predetermined pattern signal for detection supplied to the pixel electrode by the display control circuit.

9. The display device according to claim 8, wherein the display control circuit supplies an image signal of a predetermined gray scale as the detection pattern signal to the pixel electrode, and
   the touch detection circuit acquires the internal-noise detection signal in correspondence with the predetermined gray scale.

10. The display device according to claim 9, wherein the display, control circuit supplies a plurality of image signals of various gray scales that are different from each other as the detection pattern signal to the pixel electrode in the blanking periods repeated for a plurality of times, and
    the touch detection circuit acquires the internal-noise detection signals in correspondence with the various gray scales, respectively.

11. The display device according to claim 1, wherein the reference noise data is experimental data pre-acquired through a predetermined experiment.

12. The display device according to claim 1, wherein the common electrode is divided into a plurality of electrode patterns each having a stripe shape.

13. The display device according to claim 12, wherein the display control circuit drives the plurality of electrode patterns in such a manner that a group of electrode patterns selected from the plurality of electrode patterns are driven at a time, the selection of the several electrode patterns being sequentially shifted.

14. The display device according to claim 1, further comprising:
a circuit substrate with the display control circuit therein; and
an opposed substrate facing the circuit substrate,
wherein the display pixel electrodes are disposed on a side close to the opposed substrate, on the circuit substrate,
the common electrode is disposed on a side close to the circuit substrate, on the opposed substrate, and
the display function layer is disposed to be inserted between the display pixel electrode on the circuit substrate and the common electrode on the opposed substrate.

15. The display device according to claim 14, wherein the display function layer is a liquid crystal layer.

16. The display device according to claim 1, further comprising:
a circuit substrate with the display control circuit therein; and
an opposed substrate facing the circuit substrate,
wherein the common electrode and the display pixel electrode are stacked in order, with an insulating layer in between, on the circuit substrate, and
the display function layer is based on interaction between the display pixel electrode on the circuit substrate and the opposed substrate.

17. The display device according to claim 16, wherein the display function layer is a liquid crystal layer which operates in a lateral-electric-field mode.

18. An electronic unit, comprising: a touch-sensor-provided display device, the display device including:
a plurality of display pixel electrodes;
a common electrode provided to oppose the display pixel electrodes;
a display function layer having an image display function;
a display control circuit performing image display control by applying a pixel voltage based on an image signal to each of the display pixel electrodes and applying
a common drive voltage to the common electrode, the common drive voltage being reversed in polarity in synchronization with a drive cycle of the image display control;
a touch detection electrode cooperating with the common electrode to form a capacitor; and
a touch detection circuit performing a detection operation of detecting an external proximity object, based on a detection signal obtained from the touch detection electrode in response to the common drive voltage applied to the common electrode,
wherein the touch detection circuit corrects the detection signal obtained from the touch detection electrode with use of the image signal and reference noise data, the reference noise data based on a gray scale value of the image signal and a detection signal value which are correlated with each other, the value of the detection signal including internal noise resulting from the image-signal writing operation for image display with the gray scale value;
wherein the touch detection circuit prepares a correction table configured of gray scale values of the image signals actually input and the detection signal values given by the reference noise data which are correlated with each other for every predetermined pixel region including predetermined number of the display pixel electrodes, and
the touch detection circuit corrects the detection signal obtained from the touch detection electrode with use of the correction table.

* * * * *